(12) United States Patent
Sano et al.

(10) Patent No.: US 7,643,247 B2
(45) Date of Patent: Jan. 5, 2010

(54) β-PHASE TANTALUM THIN-FILM RESISTOR AND THIN-FILM MAGNETIC HEAD WITH THE RESISTOR

(75) Inventors: Masashi Sano, Tokyo (JP); Kento Edakawa, Tokyo (JP); Nobuyoshi Morizumi, Tokyo (JP); Norio Kiuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 568 days.

(21) Appl. No.: 11/634,037

(22) Filed: Dec. 5, 2006

(65) Prior Publication Data

US 2007/0127161 A1 Jun. 7, 2007

(30) Foreign Application Priority Data

Dec. 6, 2005 (JP) ............... 2005-351881

(51) Int. Cl.
*G11B 5/33* (2006.01)
*G11B 5/31* (2006.01)
*G11B 21/21* (2006.01)
*H01C 7/00* (2006.01)

(52) U.S. Cl. ............. 360/128; 360/125.74; 360/125.31; 338/308

(58) Field of Classification Search ................. 338/308; 360/75, 128, 125.3, 294.7, 125.74, 125.31, 360/125.71
See application file for complete search history.

(56) References Cited

U.S. PATENT DOCUMENTS

| | | | |
|---|---|---|---|
| 3,391,373 A * | 7/1968 | Altman | 338/308 |
| 5,442,224 A | 8/1995 | Yoshimizu et al. | 257/536 |
| 5,654,207 A | 8/1997 | Fukuyama et al. | 204/192 |
| 5,991,113 A | 11/1999 | Meyer et al. | 360/75 |
| 2003/0099054 A1 | 5/2003 | Kamijima | 360/59 |
| 2003/0174430 A1 | 9/2003 | Takahashi et al. | 360/75 |
| 2006/0063025 A1 * | 3/2006 | Huang et al. | 428/627 |

FOREIGN PATENT DOCUMENTS

| | | |
|---|---|---|
| JP | 2003-242614 | 8/2003 |
| WO | WO 03065458 A2 * | 8/2003 |
| WO | WO 2005095263 A2 * | 10/2005 |

OTHER PUBLICATIONS

G. Feinstein and R. D. Huttemann, "Factors Controlling the Structure of Sputtered Tantalum Films", Thin Solid Films, vol. 16, pp. 129-145 (1973).*

R. Hoogeven, et al., "Texture and Phase Transformation of Sputter-Deposited Metastable Ta Films And Ta/Cu Multilayers", Thin Solid Films 275, pp. 203-206, 1996.

* cited by examiner

*Primary Examiner*—William J Klimowicz
(74) *Attorney, Agent, or Firm*—Martin Novack

(57) ABSTRACT

A thin-film resistor that has a stable electric resistance, the phase transformation to the α-phase being suppressed even in the high temperature environment, is provided. The thin-film resistor has a layered structure of: a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and an electric resistance layer formed of a β-phase tantalum film or an alloy film mainly containing β-phase tantalum, and deposited on the base layer, the electric resistance layer having a crystal structure in which (002) plane of the β-phase crystal is most strongly oriented to the layer surface.

27 Claims, 12 Drawing Sheets

β-PHASE TANTALUM THIN-FILM RESISTOR AND THIN-FILM MAGNETIC HEAD WITH THE RESISTOR

PRIORITY CLAIM

This application claims priority from Japanese patent application No. 2005-351881, filed on Dec. 6, 2005, which is incorporated herein by reference.

BACKGROUND OF THE INVENTION

1. Field of the Invention

The present invention relates to a thin-film resistor having a β-phase (beta-phase) Ta (tantalum) film or an alloy film that consists mainly of β-phase Ta, a thin-film magnetic head having the thin-film resistor, a head gimbal assembly (HGA) having the thin-film magnetic head and a magnetic disk drive apparatus having the HGA.

2. Description of the Related Art

A β-phase Ta thin-film, which consists of Ta having β-phase structure, shows a rather high electric resistance (150 μΩcm to 200 μΩcm in resistivity) compared to the normal metals, and has a much less temperature coefficient of resistance of approximately $1 \times 10^{-4}/°$ C. (per degree C.), showing a much less temperature-dependent electric resistance. Therefore, the β-phase Ta thin-film is very useful as a material of thin-film resistors providing stable resistance property in wide temperature ranges. Actually, the β-phase Ta thin-film is utilized in various fields such as switching elements used for liquid crystal displays, as described, for examples, U.S. Pat. Nos. 5,442,224 and 5,654,207 and Japanese Patent Publication No. 2003-242614A. Further, Thin Solid Films vol. 275 1996 p. 203-206 describes a crystal structure of the β-phase Ta thin-film and influences of annealing to the crystal structure in detail.

Furthermore, the β-phase Ta thin-film resistor can be utilized as a means for adjusting a flying height of a thin-film magnetic head for the magnetic recording, in which the resistor is provided and generates heat due to applied currents.

The thin-film magnetic head in a magnetic disk drive apparatus hydrodynamically flies with a predetermined flying height on a rotating magnetic disk when writing and reading data signals. Recently, the flying height has a tendency to be set to a much smaller value to improve writing and reading performances. For that purpose, some techniques are proposed in which a heating means is provided in the thin-film magnetic head to control the much smaller flying height with high accuracy by positively using a thermal pole tip protrusion (TPTP) phenomenon, as described in U.S. Pat. No. 5,991,113 and US Patent Publications Nos. 2003/174430A and 2003/099054A. Here, the TPTP phenomenon is originally a behavior in which one end of the magnetic head element is protruded toward the surface of the magnetic disk due to a thermal expansion generated when write currents are applied to an electromagnetic coil element for writing.

In the case in which the β-phase Ta thin-film resistor is used as the heating means for generating the positive TPTP phenomenon, the one end of the magnetic head element can be protruded efficiently, under the condition of limiting the size of the heating means within an allowable range, because the resistor has a rather high electric resistance. Further, the much less temperature coefficient of resistance of the resistor enables a heating operation to be stably performed, especially in a constant current driving.

However, the use of the β-phase Ta thin-film resistor as the heating means in a high temperature environment is likely to cause the electric resistance property of the resistor to be varied, which has a possibility that the resistor might not work properly as the heating means and the reliability of the heating performance might be degraded.

Actually, the β-phase of Ta is a nonequilibrium phase and has a possibility of being transformed to the α-phase (an equilibrium phase) under the temperature of 400° C. (degree C.) or more. The α-phase Ta thin-film shows a much lower electric resistance (25 μΩcm to 80 μΩcm in resistivity) than the β-phase Ta thin-film, and has one or more order of magnitude larger temperature coefficient of resistance (approximately $1 \times 10^{-3}/°$ C. or more) than that of the β-phase Ta thin-film. Therefore, the β-phase Ta of the thin-film resistor used as the heating means in a high temperature environment has a possibility to be partially or totally transformed to the α-phase Ta. In some cases, the transformation to the α-phase Ta is likely to make trouble of the heating performance, that is, the degradation of the reliability as a heating means, because a required amount of heat cannot be generated in the high temperature environment.

Further, whatever an element utilizing the β-phase Ta thin-film is, an thermal treatment in the manufacturing process or a use in a high temperature environment has a possibility to cause a negative effect on the element properties. In fact, in the field of liquid crystal displays, it often becomes a problem that the thermal treatment in the manufacturing process of electrodes made of the β-phase Ta thin-film in switching elements causes a nonlinearity of the β-phase Ta to be degraded.

BRIEF SUMMARY OF THE INVENTION

Therefore, it is an object of the present invention to provide a β-phase Ta thin-film resistor that has a stable electric resistance, the phase transformation to the α-phase being suppressed even in the high temperature environment, a thin-film magnetic head having this β-phase Ta thin-film resistor, an HGA provided with this thin-film magnetic head and a magnetic disk drive apparatus provided with this HGA.

Here, some terms will be defined before explaining the present invention. In a layered structure of an element formed on an element-formed surface of the substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

Further, a crystal plane of a layer/film "oriented" to the layer/film surface means a face of the crystal structure of the layer/film, parallel to or almost parallel to the layer/film surface.

According to the present invention, a thin-film resistor is provided, which has a layered structure of: a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and an electric resistance layer formed of a β-phase tantalum film or an alloy film mainly containing β-phase tantalum, and deposited on the base layer, the electric resistance layer having a crystal structure in which (002) plane of the β-phase crystal is most strongly oriented to the layer surface.

In the β-phase tantalum thin-film resistor according to the present invention, it is preferable that the electric resistance layer has a crystal structure in which a full width of half maximum of a rocking curve of (002) plane of the β-phase crystal is less than 5 degrees. And the alloy film containing nickel and copper, the alloy film containing nickel and chromium or the alloy film containing copper and manganese of the double-layered film, or the single alloy film containing nickel and chromium preferably has a film thickness in a range from 2 nanometers to 10 nanometers. Further, the electric resistance layer preferably has a layer thickness in a range from 10 nanometers to 150 nanometers, and preferably has a polycrystalline structure including crystal grains with an average crystal grain diameter that is more than two-tenths of the layer thickness. Further, the electric resistance layer has a compressive stress in a direction within the layer plane. The compressive stress can be generated by forming the electric resistance layer using a sputtering technique under adequate deposition conditions.

In the above-described electric resistance layer formed on the above-described base layer, a crystal structure with (002) plane most strongly oriented can be obtained, which stabilizes the electric resistance property of the resistor due to the suppression of the phase transformation to the α-phase, even under a high temperature use environment.

Further, the base layer according to the present invention show rather high electric resistances and have less temperature coefficients of resistance compared to the normal metals, as the electric resistance layer has. As a result, the whole thin-film resistor can realize stable electric resistances in wide temperature ranges without degradation of resistance properties of the electric resistance layer.

According to the present invention, a thin-film magnetic head is further provided, which comprises: a heating element for adjusting a flying height, comprising the above-described thin-film resistor; an electromagnetic coil element for writing data signals; and a magnetoresistive (MR) effect element for reading data signals.

The above-described heating element has a stable electric resistance property in a wide temperature range. Therefore, the thin-film magnetic head provided with the heating element enables currents for heating to be sufficiently applied to the heating element for the purpose of obtaining a required flying height, which can realize a stable flying state with a much less flying height and improves reading and writing performances stably.

In the thin-film magnetic head, the MR effect element is preferably a tunnel magnetoresistive (TMR) effect element. In that case, the amount of change in the element output become rather small even though the temperature of the TMR effect element increases by the heat generated form the heating element. As a result, stable and high reading performances can be realized due to large outputs of the TMR effect element under suppressing the output variation.

According to the present invention, an HGA is further provided, which comprises: the above-described thin-film magnetic head; a support mechanism for supporting the thin-film magnetic head; trace conductors of the electromagnetic coil element and the MR effect element; and trace conductors for applying currents to the thin-film resistor.

According to the present invention, a magnetic disk drive apparatus is further provided, which comprises: at least one HGA above-described; at least one magnetic disk; and a recording/reproducing and heating control means for controlling read and write operations of the thin-film magnetic head to the at least one magnetic disk, and for controlling currents supplied to the thin-film resistor.

Further objects and advantages of the present invention will be apparent from the following description of preferred embodiments of the invention as illustrated in the accompanying drawings. Some elements have been designated with same reference numerals in the different drawings.

DETAILED DESCRIPTION OF THE INVENTION

Figure 1:
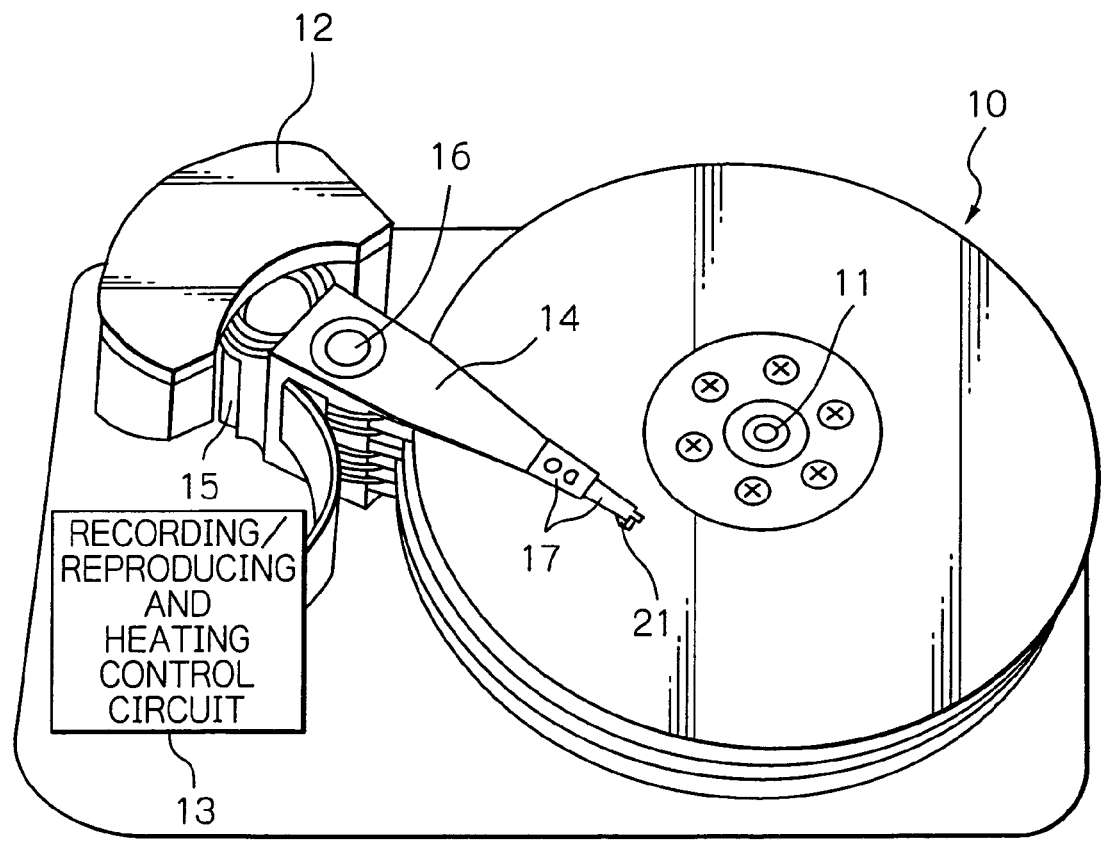
FIG. 1 shows a perspective view schematically illustrating a major portion of an embodiment of the magnetic disk drive apparatus according to the present invention.

FIG. 1 shows a perspective view schematically illustrating a major portion of an embodiment of the magnetic disk drive apparatus according to the present invention.

In FIG. 1, reference numeral 10 indicates a plurality of magnetic disks rotating around a rotational axis of a spindle motor 11, 12 indicates an assembly carriage device for positioning a thin-film magnetic head (slider) 21 on a track, and 13 indicates a recording/reproducing and heating control circuit for controlling read/write operations of the thin-film magnetic head and a heating operation of a heating element described later, respectively.

The assembly carriage device 12 is provided with a plurality of drive arms 14. These drive arms 14 are rotatable around a pivot bearing axis 16 by means of a voice coil motor (VCM)

15 and stacked in the direction along this axis 16. An HGA 17 is provided on the end portion of each drive arm 14. The thin-film magnetic head 21 is mounted on each HGA 17 in such a way as to face the surface of each magnetic disk 10. The each number of the magnetic disks 10, the drive arms 14, the HGAs 17 and the thin-film magnetic heads 21 can also be only one.

Figure 2:
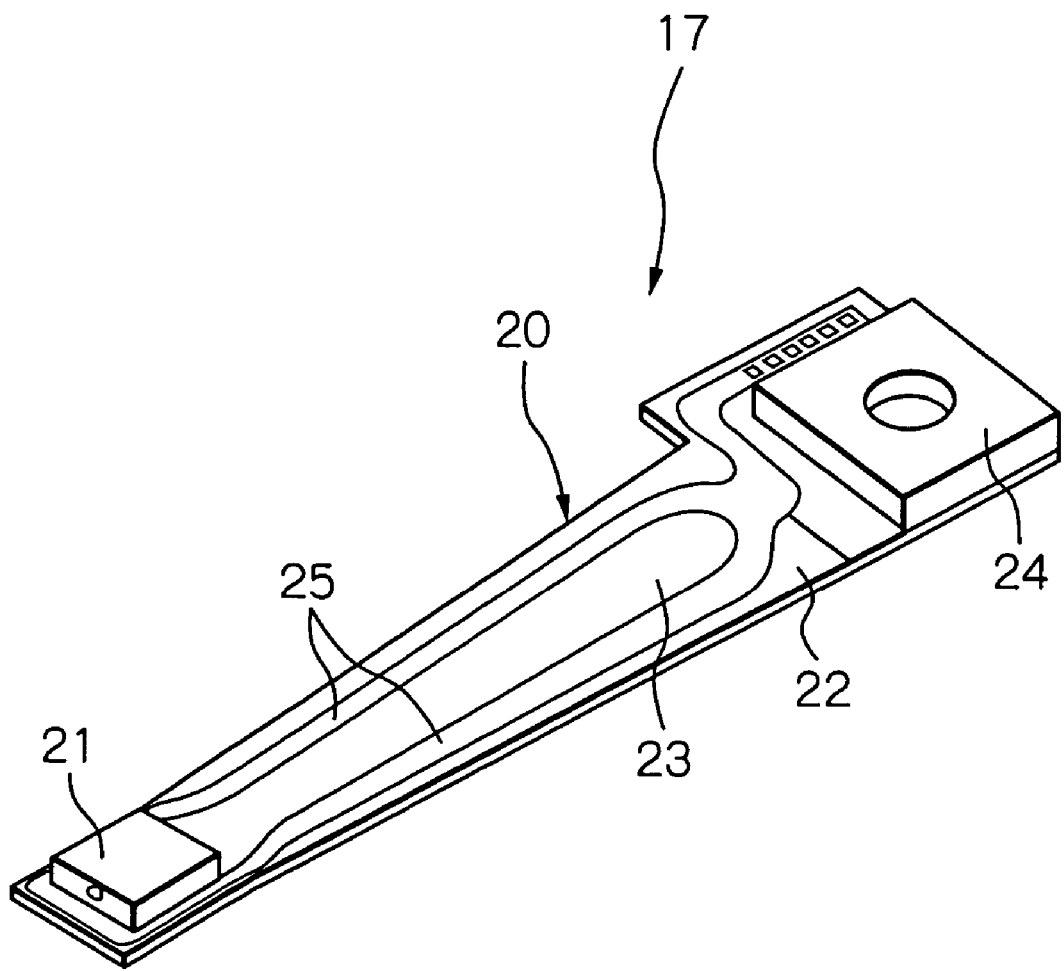
FIG. 2 shows a perspective view schematically illustrating an embodiment of the HGA according to the present invention.

FIG. 2 shows a perspective view schematically illustrating an embodiment of the HGA according to the present invention.

As shown in FIG. 2, the HGA 17 is constructed by fixing the thin-film magnetic head 21 on one end portion of a suspension 20 and by electrically connecting one end of a wiring member 25 to signal electrodes of the thin-film magnetic head 21.

The suspension 20 is a support mechanism for supporting the thin-film magnetic head 21 and is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23. It is evident that the structure of the suspension in the HGA according to the present invention is not limited to the above-described one. Though not shown in the figure, it is also possible to attach a head drive IC chip at some midpoint of the suspension 20.

Figure 3:
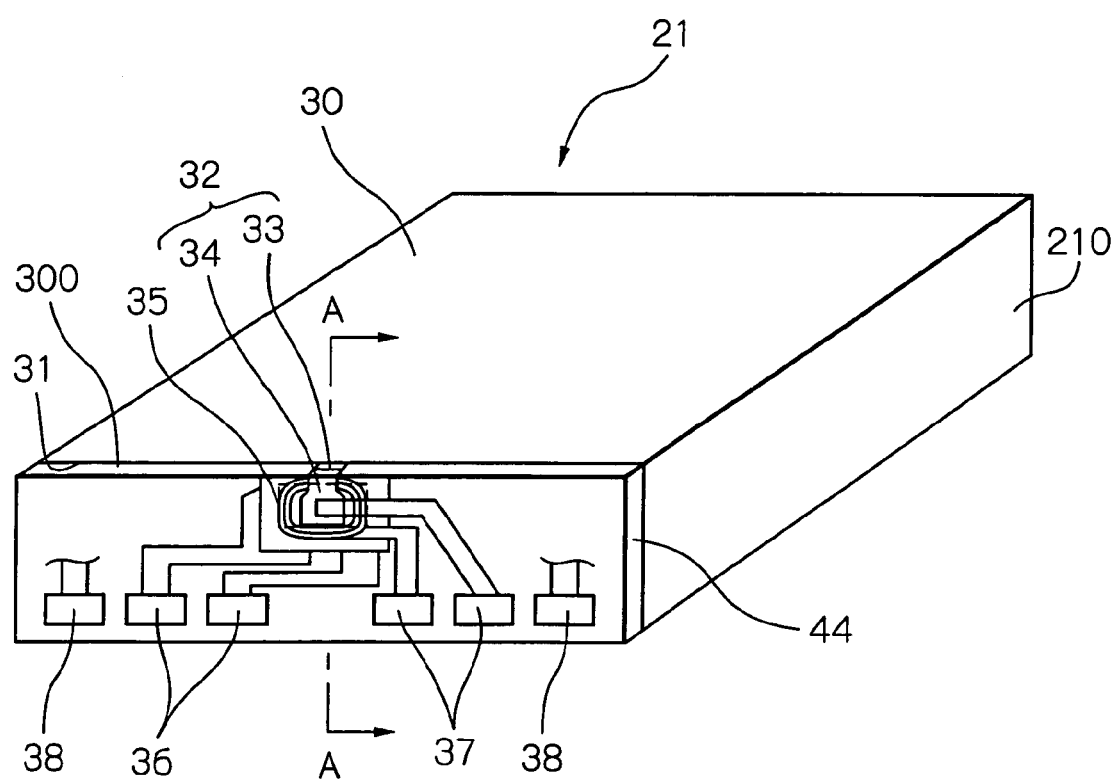
FIG. 3 shows a perspective view schematically illustrating an embodiment of the thin-film magnetic head according to the present invention.

FIG. 3 shows a perspective view schematically illustrating an embodiment of the thin-film magnetic head according to the present invention.

As shown in FIG. 3, the thin-film magnetic head 21 has a slider substrate 210 with an air bearing surface (ABS) 30 formed so as to obtain an appropriate flying height, a magnetic head element 32 formed on/above an element-formed surface 31 of the slider substrate 210, a heating element 35 (shown by broken lines) for protruding the magnetic head element 32 toward the magnetic disk due to thermal expansion, and two sets of two signal electrodes 36 and 37 and two drive electrodes 38 exposed on the surface of an overcoat layer 44 formed on the element-formed surface 31. The magnetic head element 32 has an magnetoresistive (MR) effect element 33 for reading data signals and an electromagnetic coil element 34 for writing data signals. The two signal electrodes 36 are connected with the MR effect element 33, the two signal electrodes 37 are connected with the electromagnetic coil element 34, and the two drive electrodes 38 are connected with the heating element 35.

The two drive electrodes 38 are disposed on both sides of a group of the four signal electrodes 36 and 37 respectively. The disposition can prevent a crosstalk between the wirings of the MR effect element and the electromagnetic coil element as is described in Japanese patent Publication No. 2004-234792A. Of course, when the generated crosstalk is within an allowed range, the two drive electrodes 38 may be disposed in intermediate positions among the four signal electrodes 36 and 37. The number and positions of the electrodes are not limited to the mode in FIG. 3. In the embodiment shown in FIG. 3, there are six electrodes, however it is also possible to provide five electrodes and a ground connecting to the slider substrate instead of the six electrodes.

One ends of the MR effect element 33 and the electromagnetic coil element 34 reach a head end surface 300 on the side of the ABS 30. During reading and writing operations, the thin-film magnetic head 21 hydrodynamically flies with a predetermined flying height on the rotating magnetic disk, and the MR effect element 33 reads data signals by sensing signal fields from the magnetic disk, and the electromagnetic coil element 34 writes data signals by applying signal fields to the magnetic disk, the one ends of the elements being opposed to the surface of the magnetic disk.

Further, the heating element 35 are provided in a position between the MR effect element 33 and the electromagnetic coil element 34 and near the head end surface 300 as described later in detail. The magnetic head element 32 is protruded toward the surface of the magnetic disk in such a way that the head end surface 300 is swelled, due to the thermal expansion of the element 32 itself by heat generated from the heating element 35, and due to the extrusion of the element 32 by thermal expansion of the surrounding materials. By controlling the amount of the protrusion with adjusted applied powers to the heating element 35, the flying height can be controlled to a desired small value.

By providing the heating element 35 in the position shown in FIG. 3, the heat generated from the heating element 35 is directly conducted to the magnetic head element 32. Therefore, the end of the magnetic head element 32 can be efficiently protruded with less power. However, the position of the heating element 35 is not limited to the above-described embodiment. For example, the heating element may be provided in a position opposed to the head end surface 300 in relation to the magnetic head element 32. In that case, a more amount of heat is required to protrude the end of the magnetic head element and the heating element has a tendency to have a higher temperature, compared to the above-described embodiment. Therefore, it is also preferable on this case to use the heating element according to the present invention, because the phase transformation from the β-phase to the α-phase is suppressed even in the high temperature use environment.

Figure 4A:
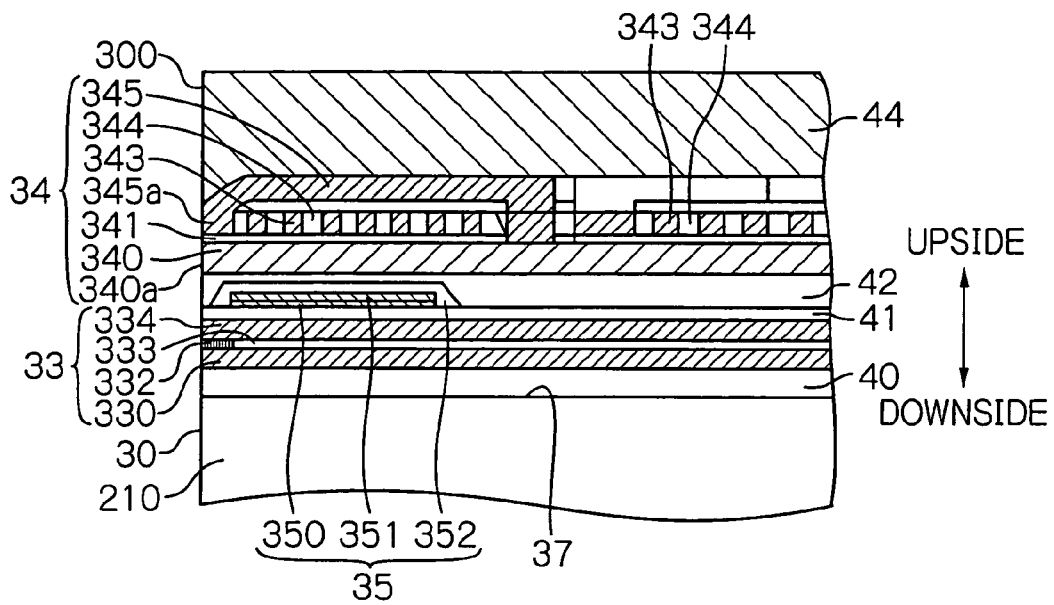
FIG. 4a shows a cross-sectional view taken along the line A-A in FIG. 3 illustrating a major portion of an embodiment of the thin-film magnetic head for longitudinal magnetic recording according to the present invention.
Figure 4B:
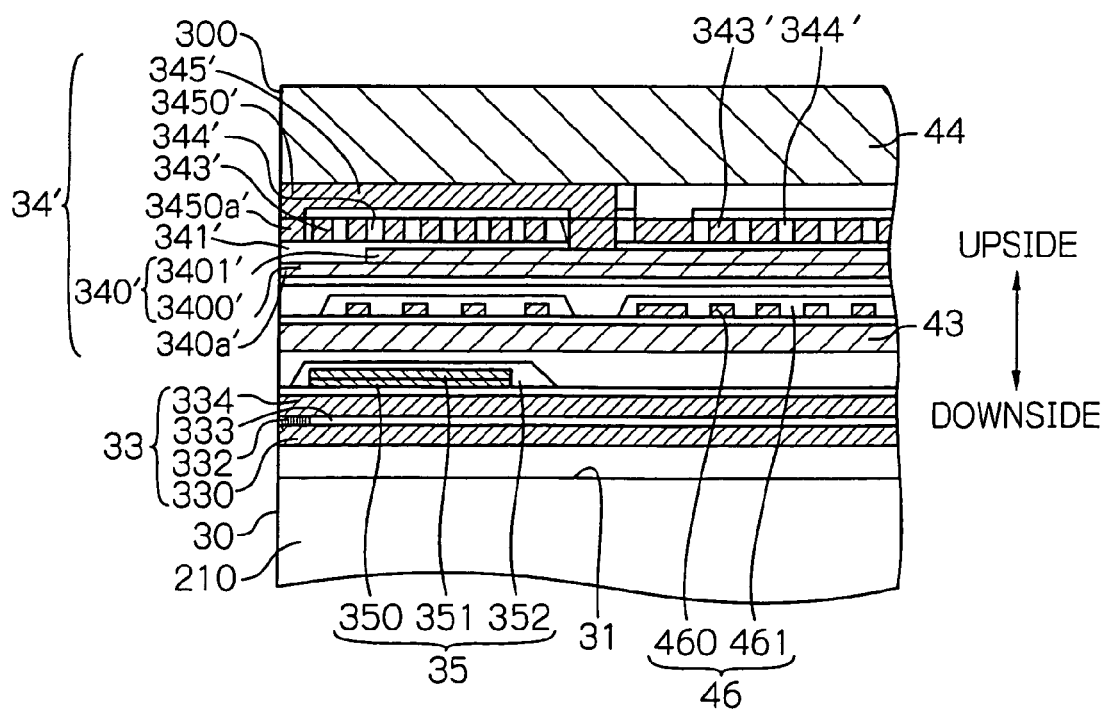
FIG. 4b shows a cross-sectional view taken along the line A-A in FIG. 3 illustrating a major portion of an embodiment of the thin-film magnetic head for perpendicular magnetic recording according to the present invention.

FIG. 4a shows a cross-sectional view taken along the line A-A in FIG. 3 illustrating a major portion of an embodiment of the thin-film magnetic head for longitudinal magnetic recording according to the present invention. And FIG. 4b shows a cross-sectional view taken along the line A-A in FIG. 3 illustrating a major portion of an embodiment of the thin-film magnetic head for perpendicular magnetic recording according to the present invention. In FIG. 4b, components corresponding to the components shown in FIG. 4a are designated with same reference numerals as in FIG. 4a, and the explanations of their structures are omitted.

In FIG. 4a, the slider substrate 210 has the ABS 30 opposed to the surface of the magnetic disk. On/above the element-formed surface 31 as a side surface when the ABS 30 is set to a bottom, the MR effect element 33, the electromagnetic coil element 34, the heating element 35 and the overcoat layer 44 covering these elements are mainly formed.

The MR effect element 33 includes an MR effect multilayer 332, an insulating layer 333 surrounding the rear side surface and both side surfaces opposed to each other in the track width direction of MR effect multilayer 332, and the a lower shield layer 330 and an upper shield layer 334 between which the MR effect multilayer 332 is sandwiched. The MR effect multilayer 332 includes a tunnel magnetoresistive (TMR) effect multilayered film in which a tunnel barrier layer is sandwiched between a pinned layer and a free layer. When the magnetization direction of the free layer changes in response to signal fields, tunnel currents increase/decrease due to the variation in the state densities of up and down spin bands of the free layer. As a result, the electric resistance of the MR multilayer 332 is changed. The measurement of this resistance change enables the weak and local signal fields to be surely detected with high sensitivity. The upper and lower shield layers 334 and 330 play a role of shielding external magnetic fields that causes noise for the MR multilayer 332, as well as of applying sense currents as electrodes in a direction perpendicular to the stacking plane (the surface of the stacked layer) of the MR effect multilayer 332.

In this embodiment, the heating element 35 is positioned very close to the MR effect element 33. Therefore, the heat generated from the heating element 35 causes the temperature of the MR effect element 33 to be considerably increased. However, in the case of using the TMR effect element as the MR effect element 33, the variation in the element output can be suppressed even under the considerable increase in the element temperature. Generally, the temperature coefficient of resistance of the TMR effect element is negative due to the behavior of tunnel currents flowing through a dielectric material of the tunnel barrier layer. And the absolute value of the temperature coefficient is one or more order of magnitude smaller than that of a giant magnetoresistive (GMR) effect element showing a positive value of temperature coefficient due to metallic conduction. As a result, stable and high reading performances can be realized due to large outputs of the TMR effect element under suppressing the output variation.

However, instead of the TMR effect multilayered film, the MR effect multilayer may include a current-perpendicular-to-plane giant magnetoresistive (CPP-GMR) effect multilayered film or a current-in-plane giant magnetoresistive (CIP-GMR) effect multilayered film. These multilayered films can sense signal fields from the magnetic disk with very high sensitivity. When the MR effect multilayer 332 includes the CIP-GMR effect multilayered film, upper and lower shield layers are provided instead of the upper and lower electrode layers 334 and 330, and each of two shield gap layers are inserted between the MR effect multilayer 332 and each of the upper and lower shield layers. Further, a lead conductive layer is provided for applying sense currents and bringing out reproduction outputs.

The electromagnetic coil element 34 is for longitudinal magnetic recording in the present embodiment, and has a lower magnetic pole layer 340, a write gap layer 341, a write coil layer 343, a coil-insulating layer 344 and an upper magnetic pole layer 345. The upper and lower magnetic pole layers 345 and 340 are magnetic paths to guide magnetic fluxes excited by currents flowing through the write coil layer 343, and the end portions 345a and 340a pinch the end portion in the head end surface 300 side of the write gap layer 341. Leakage magnetic fields from the end portion of the write gap layer 341 are used as write fields for writing data signals to the magnetic disk for longitudinal magnetic recording. The ends in the magnetic disk side of the upper and lower magnetic pole layers 345 and 340 reach the head end surface 300. The head end surface 300 is coated with diamond like carbon (DLC), etc. as an extremely thin protective film. The write coil layer 343 shown in FIG. 4a has a monolayer structure, however may have a two or more layered structure or a helical coil shape.

The heating element 35 is provided in a position between the upper electrode layer 334 and the lower magnetic pole layer 340, sandwiched between two insulating layers 41 and 42. The heating element 35 has a structure in which a heating-element insulating layer 352 covers a stacked structure of a base layer 350 and an electric resistance layer 351. The stacked structure of the base layer 350 and the electric resistance layer 351 constitutes a thin-film resistor.

The base layer 350 is formed of a double-layered film in which an alloy film containing Ni (nickel) and Cu (copper), an alloy film containing Ni and Cr (chromium) or an alloy film containing Cu and Mn (manganese) is stacked on a Ta film, or of a single alloy film containing Ni and Cr. The electric resistance layer 351 is formed of a β-phase Ta film or an alloy film mainly containing β-phase Ta deposited on the base layer 350, and has a crystal structure in which (002) plane of the β-phase crystal is most strongly oriented to the layer surface. As the result of this crystal structure, the electric resistance layer 351 has a stable resistance property, the phase transformation from the β-phase to the α-phase being suppressed even in the high temperature use environment. This stable electric resistance property enables currents for heating to be sufficiently applied to the heating element 35 for the purpose of obtaining a required flying height of the thin-film magnetic head, which can realize a stable flying state with a much less flying height and improves reading and writing performances stably.

Next, the structures of the above-described elements in the head will be explained in detail below.

A first insulating layer 40 is provided on the slider substrate 210 made of AlTiC ($Al_2O_3$—TiC), etc., formed of, for example, $Al_2O_3$ (alumina) or $SiO_2$ (silicon dioxide) with thickness of approximately 0.05 μm (micrometer) to 10 μm. The lower electrode layer 330 is stacked on the first insulating layer 40, formed of, for example, NiFe, CoFeNi, CoFe, FeN, FeZrN or a multilayer of at least two selected from these alloys with thickness of approximately 0.3 μm (micrometer) to 3 μm. On the lower electrode layer 330, the MR effect multilayer 332 is provided, which has a layered structure where the pinned layer, the tunnel barrier layer and the free layer are sequentially stacked in the case of the TNR effect multilayered film.

Further, the upper electrode layer 334 is provided in such a way that the MR effect multilayer 332 is sandwiched between the lower electrode layer 330 and the upper electrode layer 334, formed of, for example, NiFe, CoFeNi, CoFe, FeN, FeZrN or a multilayer of at least two selected from these alloys with thickness of approximately 0.3 μm to 4 μm. On the upper electrode layer 334, an insulating layer 41 is stacked, formed of such as $Al_2O_3$ with thickness of approximately 0.1 μm to 2 μm.

The base layer 350 and the electric resistance layer 351 are formed on the insulating layer 41. The electric resistance layer 351 is preferably a β-phase Ta film deposited by means of a sputtering technique under the condition that the Ar (argon) pressure during the deposition is less than 2 Pa (pascals). Generally, a β-phase Ta film formed by means of a sputtering technique under such an adequate deposition condition has a compressive stress in the direction within the film plane. As described later, the compressive stress acts so as to suppress the phase transformation from the β-phase to the α-phase. A heating-element insulating layer 352 formed of, for example, a heat-cured resist with thickness of approximately 0.1 μm to 5 μm covers the base layer 350 and the electric resistance layer 351. The just-described multilayered structure constitutes the heating element 35. The preferable thicknesses and compositions of the base layer 350 and the electric resistance layer 351 will be explained later in detail.

The heating element 35 is covered with an insulating layer 42 formed of, for example, $Al_2O_3$ with thickness of approximately 0.1 μm to 2 μm. Further, the lower magnetic pole layer 340 is provided on the insulating layer 42, formed of, for example, an alloy of two or three elements selected from a group consisting of Ni, Fe and Co, or an alloy of the two or three elements to which at least one appropriate element is added, with thickness of approximately 0.5 μm to 3 μm. The write gap layer 341 is provided on the lower magnetic pole layer 340, formed of an insulating material such as $Al_2O_3$, $SiO_2$, AlN or DLC with thickness of approximately 0.01 μm to 0.5 μm. On the write gap layer 341, the write coil layer 343 is formed of, for example, Cu with thickness of approximately 0.5 μm to 3 μm. Further, the coil-insulating layer 344 covers the write coil layer 343, formed of, for example, a heat-cured resist with thickness of approximately 0.1 μm to 5 μm.

The upper magnetic pole layer 345 is provided in such a way as to cover the coil-insulating layer 344, formed of, for example, an alloy of two or three elements selected from a group consisting of Ni, Fe and Co, or an alloy of the two or three elements to which at least one appropriate element is added, with thickness of approximately 0.5 μm to 5 μm. Further, the overcoat layer 44 formed of, for example, $Al_2O_3$ or $SiO_2$ covers the MR effect element 33, the heating element 35 and the electromagnetic coil element 34.

Next, another embodiment of the thin-film magnetic head according to the present invention will be explained by using FIG. 4b.

In FIG. 4b, an electromagnetic coil element 34' is for perpendicular magnetic recording, and is provided with a main magnetic pole layer 340', a gap layer 341', a write coil layer 343', a coil-insulating layer 344' and an auxiliary magnetic pole layer 345'. The main magnetic pole layer 340' is a magnetic path to converge and guide magnetic fluxes excited by currents flowing through the write coil layer 343', and consists of a main pole principal layer 3400' and a main pole support layer 3401'. The length (thickness) in the stacking direction of the end portion 340a' in the head end surface 300 side of the main magnetic pole layer 340' becomes smaller, corresponding to the layer thickness of the main pole principal layer 3400'. As a result, the main magnetic pole layer 340' can generate fine write fields corresponding to higher density recording.

The end portion in the head end surface 300 side of the auxiliary magnetic pole layer 345', which is defined as a trailing shield portion 3450', has a larger thickness in the stacking direction than the other portions of the auxiliary magnetic pole layer 345'. The trailing shield portion 3450' causes a magnetic field gradient between the end portion 3450a' of the trailing shield portion 3450' and the end portion 340a' of the main magnetic pole layer 340' to be steeper. As a result, a jitter of signal outputs becomes smaller, and therefore, an error rate can be reduced during reading.

In FIG. 4b, a shielding-between-elements layer 43 and a backing coil element 46 are provided between the MR effect element 33 and the electromagnetic coil element 34'. The backing coil element 46 includes a baking coil layer 460 and a backing coil insulating layer 461, and suppresses the wide area adjacent-track erase (WATE) behavior, which is an unwanted write or erase operation to the magnetic disk, by generating magnetic fluxes for negating the magnetic loop that arises from the electromagnetic coil element 34' through the upper and lower shield layers of the MR effect element 33. The write coil layer 343' has a monolayer structure in FIG. 4b, however may have an at least double-layered structure or a helical coil shape.

Figure 5:
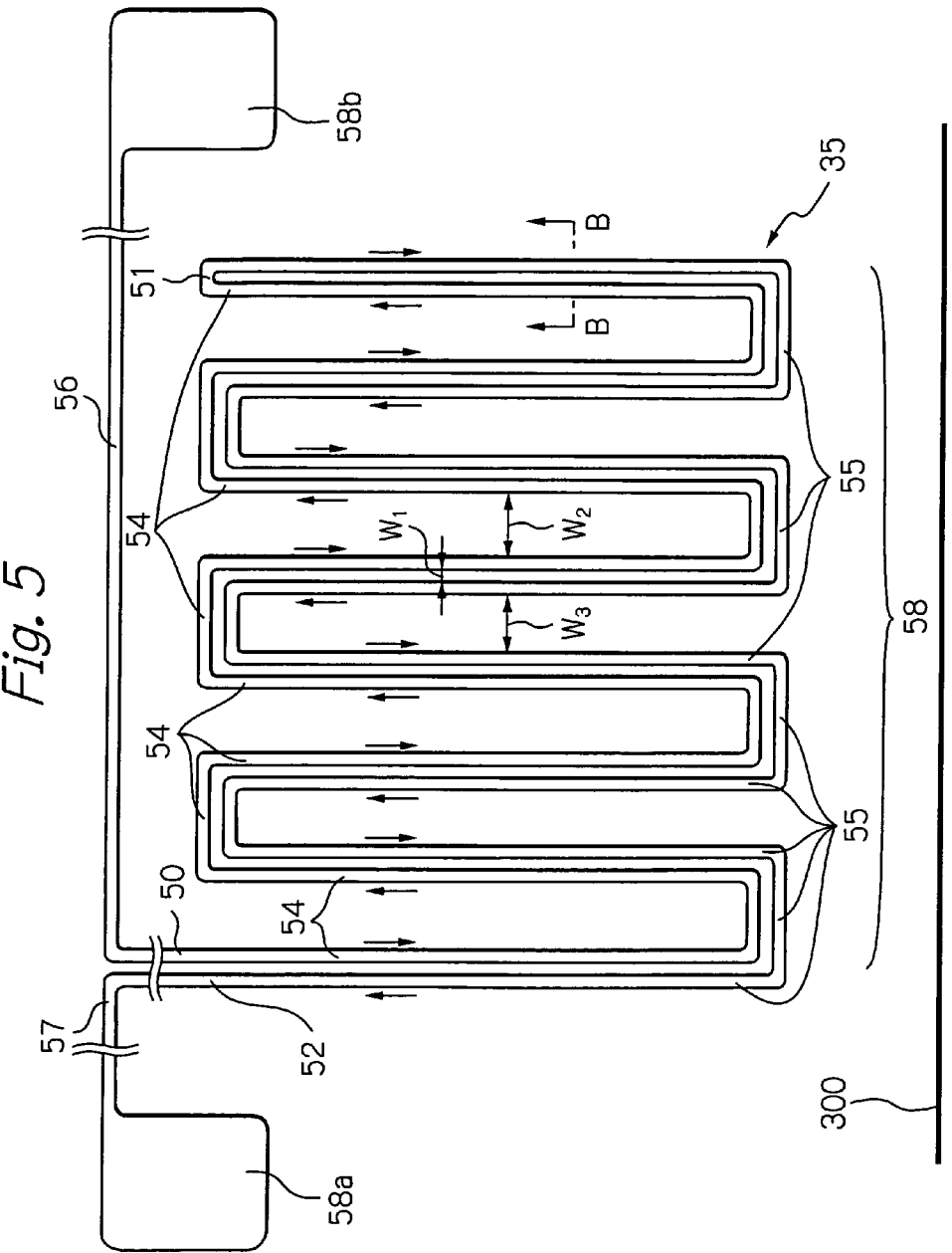
FIG. 5 shows a plain view illustrating a structure of an embodiment of the heating element.

FIG. 5 shows a plain view illustrating a structure of an embodiment of the heating element 35.

As shown in FIG. 5, the heating element 35 has: a heating layer 58 that consists of one line meandering in layer, the line formed of a multilayer of the base layer 350 and the electric resistance layer 351; and lead electrodes 58a and 58b connected respectively to both ends of the heating layer 58. Thus, the heating element 35 constitutes a current path with a predetermined length.

More specifically, the heating layer 58 consists of an up-line section 54 formed so as to meander in a square wave form from a predetermined starting point 50 to a turn-round 51, a down-line section 55 formed so as to return from the turn-round 51 to an end point 52 close to the starting point 50 meandering along the up-line section 54, a connection section 56 that connects the starting point 50 and the lead electrode 58b, and a connection section 57 that connects the end point 52 and the lead electrode 58a. A distance $W_1$ between the up-line section 54 and the down-line section 55 formed so as to run along each other is set to be narrower than a distance $W_2$ between the mutually facing portions of the up-line section 54 and a distance $W_3$ between the mutually facing portions of the down-line section 55. As is evident, the shape of the heating layer is not limited to the just-described embodiment, and may be a simple line, a U-shaped line, or any shape with which the heating element having a predetermined area can generate a required amount of heat.

Figure 6A:
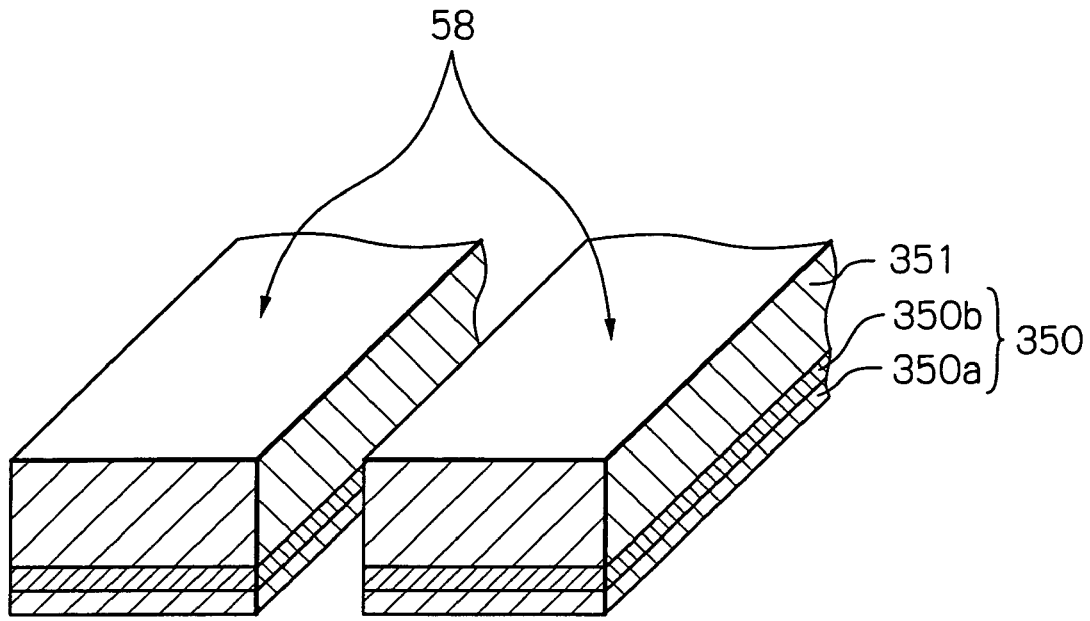
FIGS. 6a and 6b show perspective views including cross-sectional surfaces taken along the line B-B in FIG. 5, illustrating layered structures of two embodiments of the heating layer shown in FIG. 5.
Figure 6B:
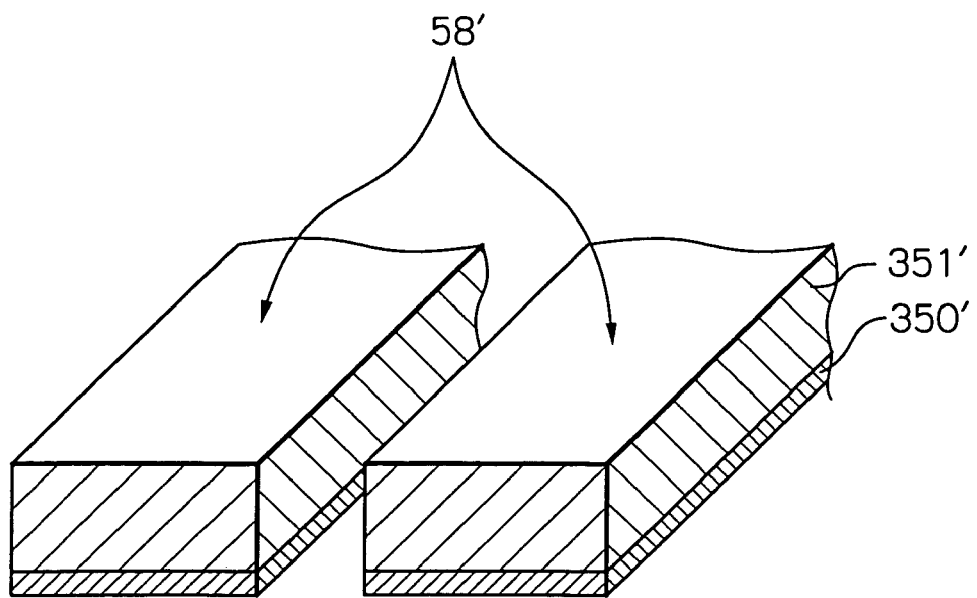

FIGS. 6a and 6b show perspective views including cross-sectional surfaces taken along the line B-B in FIG. 5, illustrating layered structures of two embodiments of the heating layer shown in FIG. 5.

As an embodiment shown in FIG. 6a, the heating layer 58 has a multilayered structure of: a base layer 350 in which a contact film 350a and a base film 350b are sequentially stacked; and an electric resistance layer 351. The contact film 350a is formed of Ta with thickness of approximately 3 nm to 10 nm. The base film 350b is formed of an alloy film containing Ni and Cu, an alloy film containing Ni and Cr or an alloy film containing Cu and Mn, with thickness of approximately 2 nm to 10 nm, preferably approximately 2 nm to 6 nm. Here, the alloy film containing Ni and Cu has a composition in which the content of Ni is within a range of approximately 20 atomic % (percent) to 60 atomic %, the content of Cu is within a range of approximately 40 atomic % to 80 atomic %, and Mn, etc. may be added. The alloy film containing Ni and Cr has a composition in which the content of Ni is within a range of approximately 55 atomic % to 80 atomic %, the content of Cr is within a range of approximately 20 atomic % to 45 atomic %, and Al, etc. may be added. Further, the alloy film containing Cu and Mn has a composition in which the content of Cu is within a range of approximately 80 atomic % to 90 atomic %, the content of Mn is within a range of approximately 10 atomic % to 20 atomic %, and Ni, etc. may be added.

The lower limit value of approximately 2 nm of the thickness range of the base film 350b is a required minimum for forming a crystal structure of the base film itself needed to acts as an adequate base, as described later in detail. And the upper limit value of approximately 6 nm of the thickness range of the base film 350b is based on a standard of resistance degradation in the production field, also as described later in detail. Further, the upper limit value of approximately 10 nm of the thickness range of the base film 350b is a value above which the formed β-phase Ta thin-film might be transformed easily, also as described later in detail.

The electric resistance layer 351 is formed of a β-phase Ta film or an alloy film mainly containing β-phase Ta with thickness of approximately 10 nm to 1 μm, preferably approximately 10 nm to 150 nm as described later, more preferably approximately 10 nm to 110 nm. Elements that can be added to the Ta film may be at least one selected from a group of Al, Mn, Cu, Cr, Fe, Mo, Co, Rh, Si, Ir, Pt, Ti, Nb, Zr and Hf. The content of the added element is preferably 5 atomic % or less.

Meanwhile, as another embodiment shown in FIG. 6b, the heating layer 58' has a multilayered structure of: a base layer 350' that consists of a monolayer film; and an electric resistance layer 351'. The monolayer film of the base layer 350' is formed of an alloy film containing Ni and Cr with thickness of approximately 2 nm to 10 nm. Here, the alloy film has a composition in which the content of Ni is within a range of approximately 55 atomic % to 80 atomic %, the content of Cr is within a range of approximately 20 atomic % to 45 atomic %, and Al, etc. may be added. The above-described thickness range of the base layer 350' is determined by the same reason as the above-described one for the base film 350b shown in FIG. 6a.

The electric resistance layer 351' is formed of a β-phase Ta film or an alloy film mainly containing β-phase Ta with thickness of approximately 10 nm to 1 μm, preferably approximately 50 nm to 100 nm. Elements that can be added to the Ta film may be at least one selected from a group of Al, Mn, Cu, Cr, Fe, Mo, Co, Rh, Si, Ir, Pt, Ti, Nb, Zr and Hf. The content of the added element is preferably 5 atomic % or less.

The above-described electric resistance layers 351 and 351' have a crystal structure in which (002) plane of the β-phase crystal is oriented with the highest intensity to the layer surface, by being formed on the base layers 350 and 350' respectively. Actually, a diffraction peak intensity of (002) plane becomes highest when performing a θ-2θ scan of the X-ray diffraction measurement. As a result, as described later in detail, the phase transformation from the β-phase to the α-phase is suppressed even in a high temperature use environment.

Generally, according to the Powder Diffraction File (PDF) published by the International Center for Diffraction Data (ICDD), in the case that crystal grains of the β-phase Ta have completely random orientations, a diffraction peak intensity of (411) plane becomes highest when performing a θ-2θ scan of the X-ray diffraction measurement. And a diffraction peak intensity of (002) plane becomes approximately 40% (percent) of the (411) plane intensity. On the contrary, a diffraction peak intensity of (002) plane becomes highest in the β-phase Ta of the electric resistance layer 351 and 351' according to the present invention, which means that (002) plane is most strongly oriented to the layer surface.

It should be noticed that (002) plane and (411) plane of the β-phase Ta described in the present specification are defined to be planes corresponding to diffraction peaks at about 2θ=33.5° (degrees) to 33.7° and about 2θ=40° respectively, when using CuKα as a X-ray source and defining the crystal lattice of the β-phase Ta as a tetragonal with lattice constants of a=1.019 nm and c=0.531 nm.

Further, the base layers 350 and 350' according to the present invention show rather high electric resistances and have less temperature coefficients of resistance compared to the normal metals, as the electric resistance layers 351 and 351' have. As a result, the whole heating layers 58 and 58' can realize stable electric resistances in wide temperature ranges without degradation of resistance properties of the electric resistance layers 351 and 351'.

Figure 7:
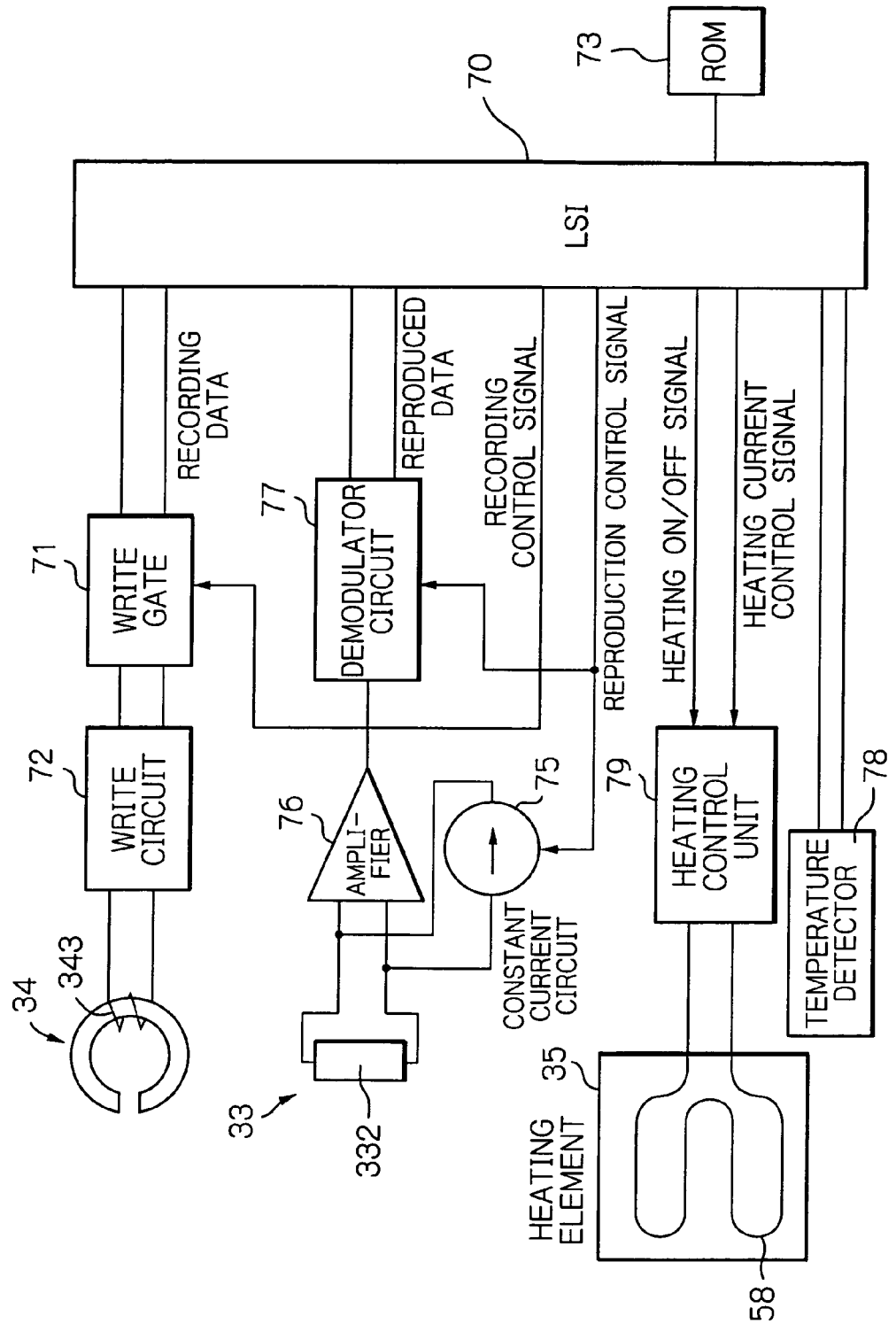
FIG. 7 shows a block diagram illustrating a circuit structure of the recording/reproducing and heating control circuit 13 of the magnetic disk drive apparatus shown in FIG. 1.

FIG. 7 shows a block diagram illustrating a circuit structure of the recording/reproducing and heating control circuit 13 of the magnetic disk drive apparatus shown in FIG. 1.

In FIG. 7, reference numeral 70 indicates a control LSI, 71 indicates a write gate for receiving recording data from the control LSI 70, 72 indicates a write circuit, 73 indicates a ROM that stores a control table and so on for controlling current values applied to the heating element 35, 75 indicates a constant current circuit for supplying sense currents to the MR effect element 33, 76 indicates an amplifier for amplifying the output voltage of the MR effect element 33, 77 indicates a demodulator circuit for outputting reproduced data to the LSI 70, 78 indicates a temperature detector, and 79 indicates a heating control unit for controlling the heating element 35, respectively.

The recording data that is output from the control LSI 70 is supplied to the write gate 71. The write gate 71 supplies recording data to the write circuit 72 only when a recording control signal that is output from the control LSI 70 instructs a write operation. The write circuit 72 passes write currents corresponding to the recording data through the write coil layer 343, and the electromagnetic coil element 34 writes data signals on the magnetic disk.

Constant currents flow from the constant current circuit 75 to the MR effect multilayer 332 only when the reproduction control signal that is output from the control LSI 70 instructs a read operation. The signal read by the MR effect element 33 is amplified by the amplifier 76, and then demodulated by the demodulator circuit 77. After that, the obtained reproduced data are output to the control LSI 70.

The heating control unit 79 receives a heating ON/OFF signal and a heating current control signal that are output from the control LSI 70. When the heating ON/OFF signal is an ON operation instruction, a current flows into the heating layer 58 of the heating element 35. The current value is controlled to a value corresponding to the heating current control signal. The control LSI 70 determines the values of the heating ON/OFF signal and the heating current control signal based on the state of write/read operations, the temperature value measured by the temperature detector 78, and so on.

As the result of the just-described circuit structure, it becomes possible to realize more diversified current application modes by providing the above system with the heating ON/OFF signal and the heating current control signal, independently from the recording/reproducing control signal system.

It is evident that the circuit structure of the recording/ reproducing and heating control circuit is not limited to that shown in FIG. 7. It is possible to specify the write and read operations using signals other than the recording/reproducing control signal. The heating operation by using the heating element 35 is preferably performed during both writing and reading, however, the heating operation may be performed only when either writing or reading, or only in a predetermined period. Furthermore, it is possible to use not only direct current (DC) but also alternate current (AC) or pulse current, etc., as the current applied to the heating element 35.

Hereinafter, the operation and effect of a thin-film resistor according to the present invention, and the effect of providing a thin-film magnetic head with the thin-film resistor will be explained by using some examples.

Figure 8A:
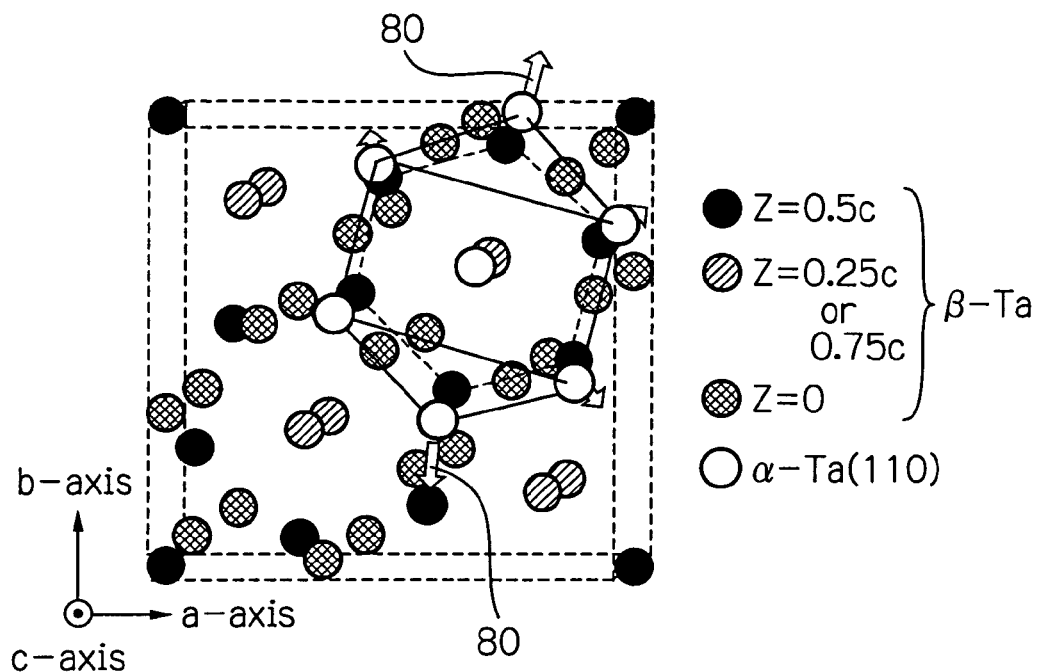
FIGS. 8a and 8b show atomic position views explaining the mechanism to suppress the phase transformation to the α-phase in the β-phase Ta thin-film according to the present invention.
Figure 8B:
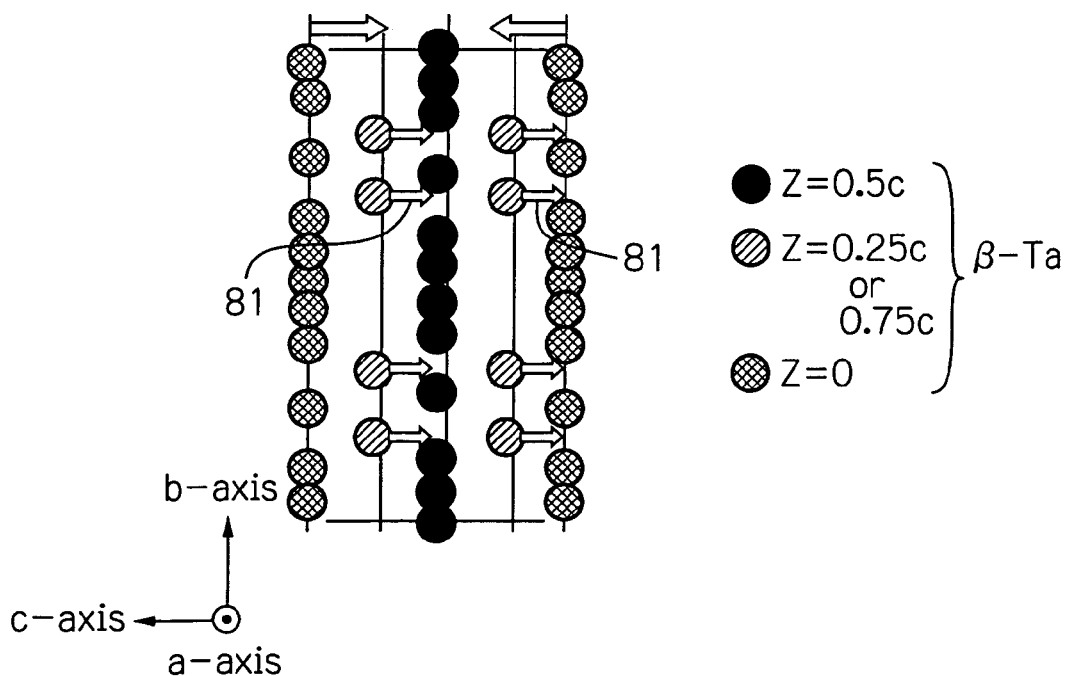

FIGS. 8a and 8b show atomic position views explaining the mechanism to suppress the phase transformation to the α-phase in the β-phase Ta thin-film according to the present invention. Here, FIG. 8a shows positions of Ta atoms in (002) plane equivalent to c-plane of the β-phase Ta, which is parallel to the film surface, and FIG. 8b shows positions of Ta atoms in the cross-sectional surface of the film.

In FIG. 8a, Ta atoms in (002) plane of the β-phase Ta are indicated by black circles (z=0.5c (c is a lattice parameter)), and Ta atoms in (110) plane of the α-phase Ta after the phase transformation are indicated by white circles (α-Ta (110)). As shown in FIG. 8a, during the phase transformation from the β-phase to the α-phase, the β-phase Ta atoms are displaced to the positions of the α-phase Ta atoms, that is, toward such a direction as indicated by an arrow 80. Therefore, it is understood that the phase transformation requires an expansion of atomic distances in (002) plane of the β-phase Ta. On the other hand, as shown in FIG. 8b, Ta atoms must be displaced toward such a direction as indicated by an arrow 81 for the phase transformation. Therefore, it is understood that the phase transformation requires a shrinking of atomic distances in the direction of c-axis of the β-phase Ta, that is, the direction perpendicular to (002) plane.

Meanwhile, generally, a β-phase Ta thin-film has a compressive stress in the direction within the film plane when the thin-film has been deposited by means of a sputtering technique under appropriate conditions, as described above. And the β-phase Ta thin-film according to the present invention has (002) plane oriented most strongly to the film surface, because the base layer 350 or 350' shown in FIG. 6a or 6b is used as a ground for crystal growth. As a result, the β-phase Ta thin-film according to the present invention has a compressive stress in the direction within (002) plane. The compressive stress acts to prevent the above-described atomic distances in (002) plane from expanding, and to prevent the above-described atomic distances in the direction perpendicular to (002) plane from shrinking. That is to say, the compressive stress works to suppress the above-described phase transformation from the β-phase to the α-phase.

The present inventors consider that the greatly strong orientation of (002) plane generated by using the base layer 350 or 350' as a ground of crystal growth can suppress the phase transformation due to action of the compressive stress.

EXAMPLES 1 TO 5 AND CONVENTIONAL SAMPLES 1 AND 2

Figure 9A:
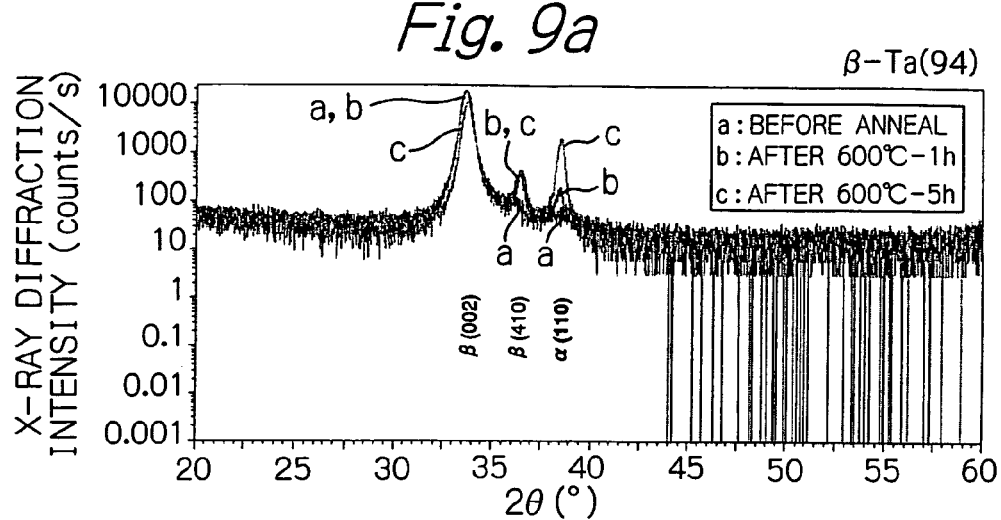
FIGS. 9a to 9c show profiles obtained by a θ-2θ scan X-ray diffraction measurement of the β-phase Ta thin-films with/without the base layer and before/after annealing.
Figure 9B:
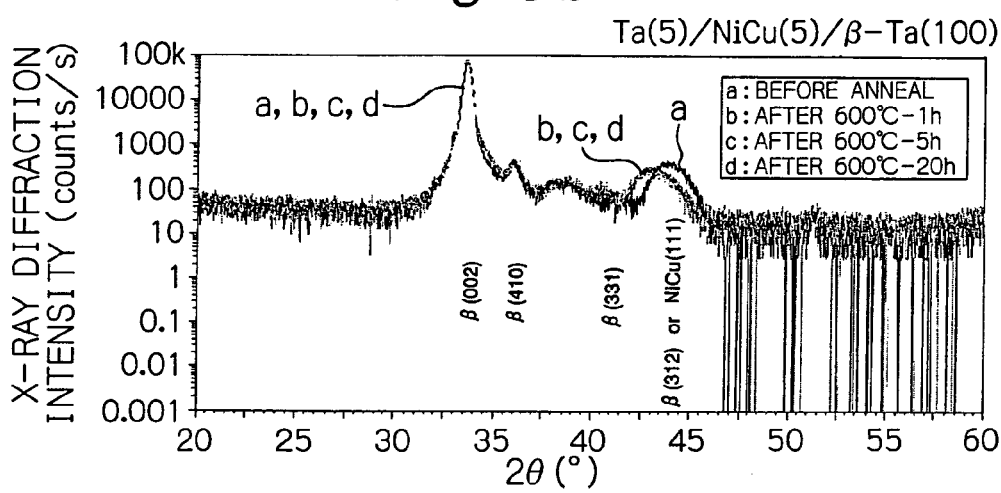
Figure 9C:
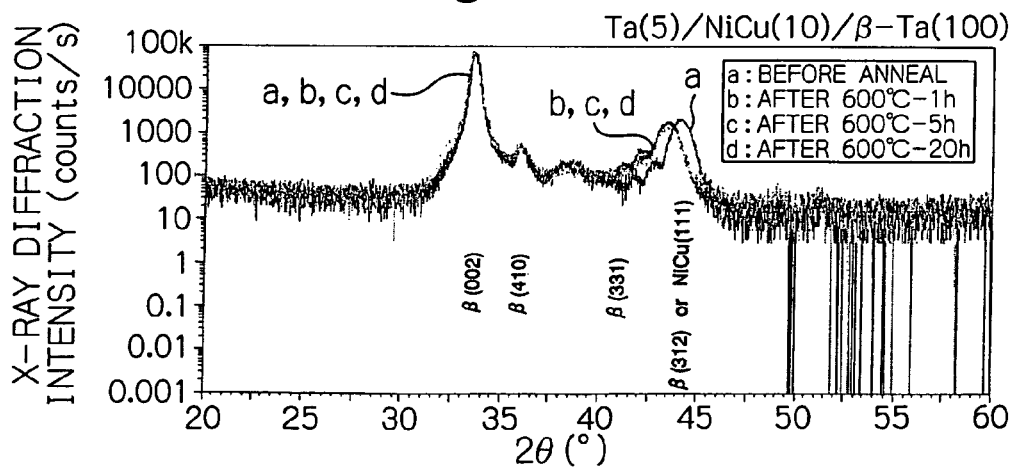

FIGS. 9a to 9c show profiles obtained by a θ-2θ scan X-ray diffraction measurement of the β-phase Ta thin-films with/without the base layer and before/after annealing. FIG. 9a is in the case of the β-phase Ta thin-film with thickness of 94 nm provided with no base layer (conventional sample 1). Here, "provided with no base layer" means that the β-phase Ta thin-film was directly deposited on an insulating layer such as $Al_2O_3$ formed on the substrate. FIG. 9b is in the case of Ta(5 nm)/NiCu(5 nm)/β-Ta(100 nm) (example 1 according to the present invention), in which Ta with thickness of 5 nm, NiCu with thickness of 5 nm and β-phase Ta with thickness of 100 nm were sequentially stacked, and FIG. 9c is in the case of Ta(5 nm)/NiCu(10 nm)/β-Ta(100 nm) (example 2 according to the present invention). All the samples were annealed in a vacuum with temperature of 600° C. for 1 to 5 hours. Further, FIGS. 9b and 9c show more case of annealing with 600° C. for 20 hours.

As shown in FIG. 9a, in conventional sample 1 (the β-phase Ta thin-film provided with no base layer), (110) plane of the α-phase Ta strongly appears after the annealing, which never appeared before the annealing. Therefore, the phase transformation from the β-phase to the α-phase is evidently generated in a considerable part of the thin-film.

On the contrary, as shown in FIGS. 9b and 9c, in the examples 2 and 3 (the β-phase Ta thin-film provided with the base layer according to the present invention), (002) plane of the β-phase Ta remains to be strongly oriented even after the annealing, as well as before the annealing, and there is no diffraction peak indicating the existence of the α-phase Ta. Therefore, it is understood that the structure having the base layer according to the present invention can sufficiently suppress the phase transformation from the β-phase to the α-phase.

To be sure, the β-phase Ta thin-film provided with no base layer has a strong orientation of (002) plane before and after the annealing. However, the intensity of the diffraction peak is a fraction of the intensity of the β-phase Ta thin-film according to the present invention shown in FIG. 9b. Here, it should be noted that the vertical axis is logarithmic.

Table 1 shows X-ray diffraction data including Full width at half maximums (FWHMs) of rocking curves of (002) plane of the β-phase Ta thin-film according to the present invention and the β-phase Ta thin-film provided with no base layer. Here, the rocking curve is a profile showing a distribution of X-ray diffraction intensity when varying the angle to the incident X-ray beam of a subject crystal plane. The smaller the FWHM of the rocking curve is, the higher becomes the degree of orientation of the crystal plane in crystal grains of the thin-film. In the table, a crystal grain diameter d is defined as an average value in the film thickness direction of the crystal grain diameters, and is determined by using Scherrer's equation ($d=0.9\lambda/(FWHM*\cos\theta)$ where $\lambda$ is a X-ray wavelength and $\theta$ is a diffraction angle) with measured values of the FWHM of (002) plane. The β-phase Ta thin-film has a polycrystalline structure including crystal grains. Further, in the table, $t_{Ta}$ is the thickness of the Ta contact film, $t_U$ is the thickness of the NiCu base film, and $t_\beta$ is the thickness of the β-phase Ta electric resistance layer.

TABLE 1

|  | $t_{Ta}$ (nm) | $t_U$ (nm) | $t_\beta$ (nm) | Int of (002) peak (kc/s) | FWHM of Rocking Curve (degree) | FWHM of (002) peak (degree) | Grain diameter d (nm) | $d/t_\beta$ |
|---|---|---|---|---|---|---|---|---|
| ex. 1 | 5 | 5 | 100 | 67.8 | 3.74 | 0.356 | 23.3 | 0.23 |
| ex. 2 | 5 | 10 | 100 | 57.7 | 3.87 | 0.365 | 22.7 | 0.23 |
| ex. 3 | 5 | 3 | 100 | 63.3 | 3.72 | 0.357 | 23.2 | 0.23 |
| ex. 4 | 5 | 7 | 100 | 63.0 | 3.71 | 0.356 | 23.3 | 0.23 |
| ex. 5 | 5 | 5 | 59 | 22.8 | 4.40 | 0.407 | 20.4 | 0.35 |
| con. 1 | — | — | 94 | 19.0 | 7.87 | 0.434 | 19.1 | 0.20 |
| con. 2 | — | — | 173 | 21.3 | 10.63 | 0.410 | 20.2 | 0.12 |

As shown in Table 1, in examples 1 to 5 according to the present invention, the FWHM of the rocking curve of (002) plane becomes a small value of less than 5° (degrees), whereas conventional samples 1 and 2 with no base layer have the FWHM values of more than 5°. Therefore, it is understood that the β-phase Ta thin-film of the present invention has an excellently high orientation of (002) plane under the effect of the base layer according to the present invention.

Also in the table, a ratio $d/t_\beta$ of the grain diameter d and the thickness $t_\beta$ of the β-phase Ta thin-film is more than 0.2 in examples 1 to 5, whereas the ratio $d/t_\beta$ is 0.2 or less in conventional samples 1 and 2. This shows that examples 1 to 5 have an enhanced growth of the crystal grains, and the ratio of the grain size to the film thickness becomes larger in examples 1 to 5. Therefore, it is understood that the β-phase Ta thin-film of the present invention has an excellently high orientation of (002) plane under the effect of the base layer according to the present invention. That is to say, the β-phase Ta thin-film according to the present invention is considered to become an excellently high orientation film due to the great growth of the crystal grains with crystal planes oriented in the same direction.

Next, Table 2 shows X-ray diffraction data of (002) plane of the β-phase Ta thin-films provided with base layers of smaller thicknesses than examples 1 to 5. In the table, a crystal grain diameter d is determined in the same way as Table 1.

TABLE 2

| $t_{Ta}$ (nm) | $t_U$ (nm) | $t_β$ (nm) | Int of (002) peak (kc/s) | FWHM of Rocking Curve (degree) | FWHM of (002) peak (degree) | Grain diameter d (nm) | $d/t_β$ |
|---|---|---|---|---|---|---|---|
| 5 | 1 | 100 | 4.6 | incapable | 0.407 | 20.3 | 0.20 |
| 5 | 2 | 100 | 62.2 | 3.82 | 0.358 | 23.2 | 0.23 |
| 5 | 3 | 100 | 63.3 | 3.72 | 0.357 | 23.2 | 0.23 |

As shown in Table 2, in the case that the NiCu base film thickness $t_U$ is 1 nm, the FWHM of the rocking curve cannot be measured because the width of the rocking curve becomes much larger. Therefore, it is understood that the very thin base film cannot act so as to orientate (002) plane of the β-phase Ta thin-film, and the β-phase Ta thin-film cannot have a crystal structure with high orientation. On the contrary, in the case that the base film thickness $t_U$ is 2 nm or more, the FWHM of the rocking curve becomes measurable, and has a small value of 5° or less, which shows that the β-phase Ta thin-film has a strong orientation of (002) plane. Further, in this case, the ratio $d/t_β$ exceeds 0.2, which indicates that the crystal grains have grown more largely. Therefore, the base film thickness $t_U$ is preferably set to be a value of 2 nm or more for sufficiently forming the crystal structure as an adequate base.

Table 3 shows rates of change $\Delta R/R_0$ (%) in the electric resistance when annealing the thin-films with temperature of 600° C. for 5 hours.

TABLE 3

| | $t_{Ta}$ (nm) | $t_U$ (nm) | $t_β$ (nm) | $\Delta R/R_0$ (%) |
|---|---|---|---|---|
| ex. 1 | 5 | 5 | 100 | −2.0 |
| ex. 2 | 5 | 10 | 100 | −8.5 |
| ex. 3 | 5 | 3 | 100 | 0.2 |
| ex. 4 | 5 | 7 | 100 | −4.4 |
| ex. 5 | 5 | 5 | 59 | −2.6 |
| con. 1 | — | — | 94 | −38.7 |
| con. 2 | — | — | 173 | −65.6 |

As shown in Table 3, in examples 1 to 5 according to the present invention, each absolute value of the rate of change $\Delta R/R_0$ is less than 10%, which indicates that the amount of decrease in electric resistance due to the annealing becomes excellently smaller compared to the conventional samples 1 and 2. This is because the phase transformation to the α-phase is suppressed in the β-phase Ta thin-film according to the present invention, as is evident from the result of FIGS. 9a to 9c.

Furthermore, when the β-phase Ta thin-film resistor, in which the β-phase Ta electric resistance layer are stacked on the above-described base layer, is used as a heating element within a thin-film magnetic head, heating operations required to realize a desired small flying height can be adequately performed because the resistance of the heating element becomes stable even in a high temperature environment. And further, the small flying height effects the stable improvement of reading and writing performances.

Figure 10:
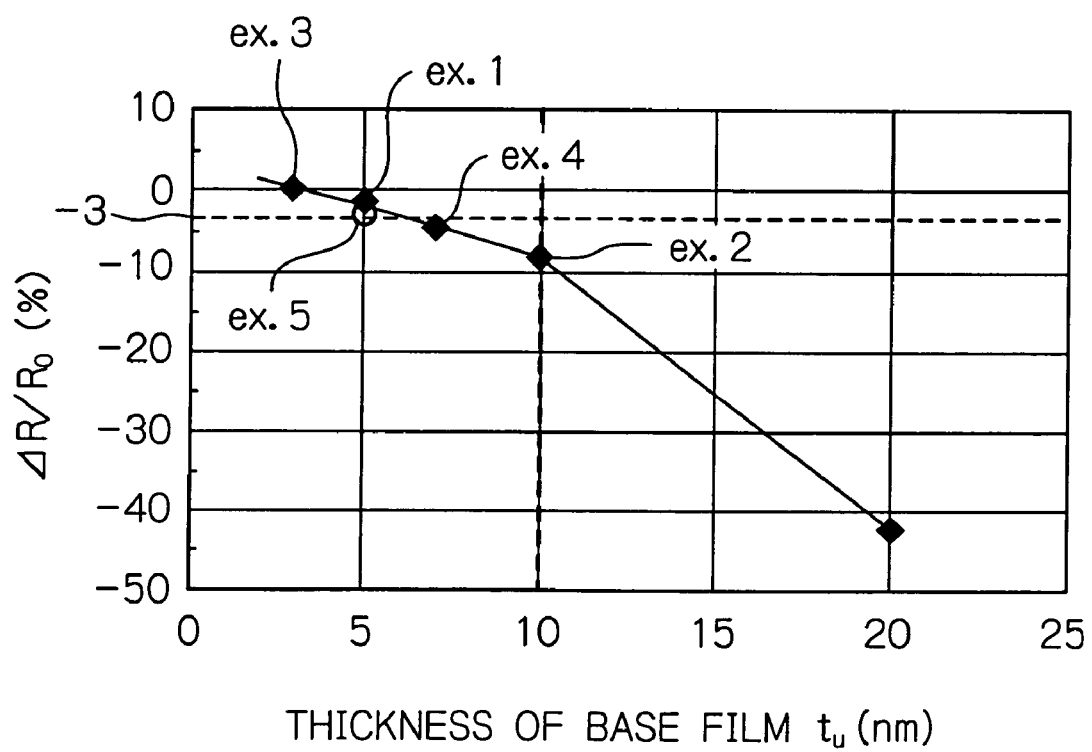
FIG. 10 shows a graph of the relation between the base film thickness and the rate of change $\Delta R/R_0$ in the β-phase Ta thin-film resistor according to the present invention.

FIG. 10 shows a graph of the relation between the base film thickness and the rate of change $\Delta R/R_0$ in the β-phase Ta thin-film resistor according to the present invention. The structures of the subject thin-film resistors are Ta(5 nm)/NiCu ($t_U$ nm)/β-Ta(100 nm or 59 nm) where $t_U$ is the NiCu base film thickness. And the horizontal axis of the graph is the thickness $t_U$.

As shown in FIG. 10, the $\Delta R/R_0$ is decreased as the NiCu base film thickness $t_U$ increases. However, the rate of the decrease in the $\Delta R/R_0$ is rather small and the $\Delta R/R_0$ value remains within −10% until $t_U$=10 nm. It should be noticed that a data point of example 5 is almost positioned on a line that data points of examples 1 to 4 make, though the β-phase Ta thickness $t_β$ of example 5 is smaller than examples 1 to 4 as shown in Table 3. This suggests that the $\Delta R/R_0$ is strongly dependent on the base film thickness within a predetermined range of the β-phase Ta thickness. Further, the rate of decrease in the $\Delta R/R_0$ becomes larger as the thickness $t_U$ exceeds 10 nm, and the $\Delta R/R_0$ shows a greatly decreased value of −43.4% at $t_U$=20 nm. The value is in the same order as conventional samples 1 and 2 (β-phase Ta thin-films provided with no base layer), which indicates that the phase transformation to the α-phase has proceeded due to the annealing in the sample with the greatly decreased $\Delta R/R_0$ value.

As a result, a point at $t_U$=10 nm on the data curve is considered to be an inflection point, and it is suggested that the transformation due to the annealing is suppressed until $t_U$=10 nm, however, considerably proceeds when the $t_U$ exceeds 10 nm. Therefore, the base film thickness $t_U$ is preferably set to be 10 nm or less. In fact, the production field judges a heating element with the electric resistance decreased by 10% or more to be a failure component or a failure part. The just-described condition that the thickness $t_U$ is 10 nm or less confirms the judgment of the production field. On the other hand, it is known experimentally that a crystal structure required to work as an adequate base cannot be sufficiently formed when the thickness $t_U$ becomes less than 2 nm. After all, the base film thickness $t_U$ is preferably set to be in a range from 2 nm to 10 nm.

Further, as the second criterion of judgment in the production field, it is considered that the amount of decrease in the electric resistance of the heating element is more preferably within 3% for maintaining high quality. Here, the $\Delta R/R_0$ becomes just about −3% at $t_U$=6 nm as shown in FIG. 10. Therefore, from the criterion, the thickness $t_U$ is more preferably in a range from 2 nm to 6 nm.

Figure 11:
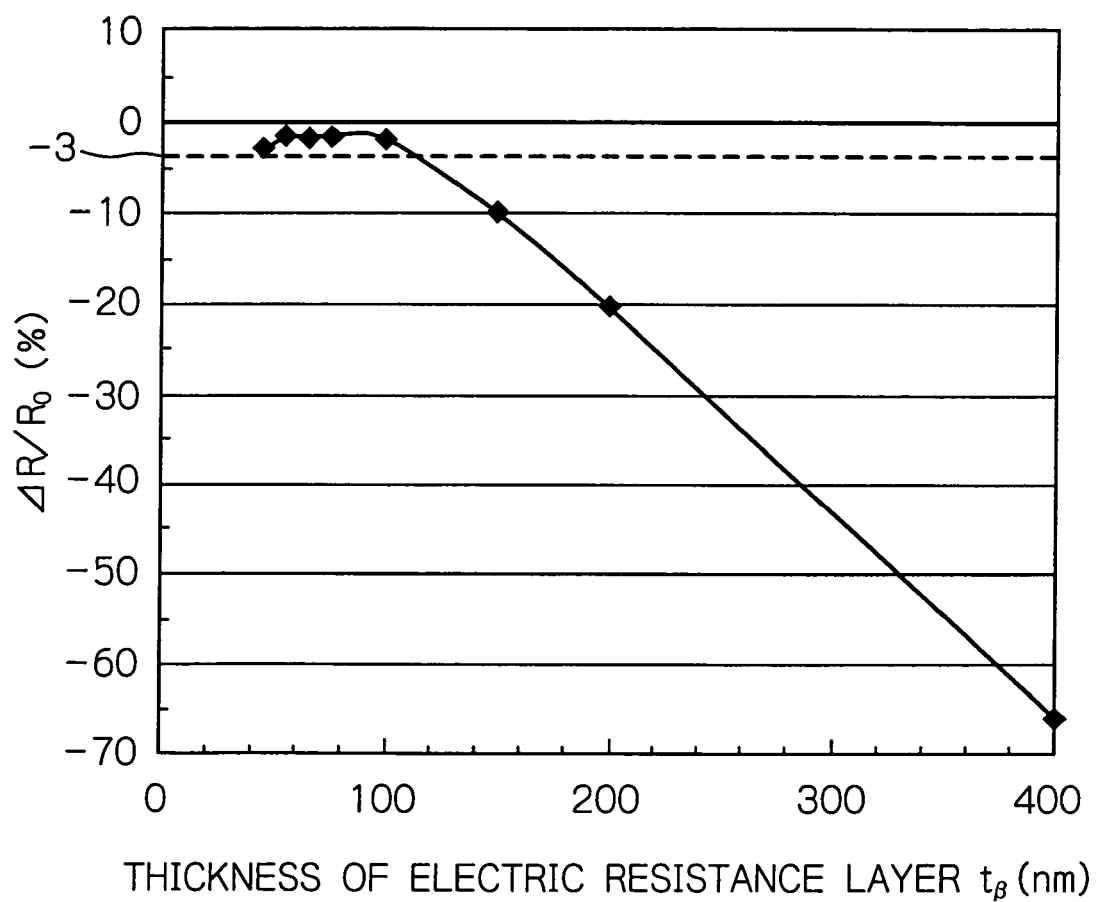
FIG. 11 shows a graph of the relation between the thickness $t_\beta$ of the electric resistance layer and the rate of resistance change $\Delta R/R_0$ in the β-phase Ta thin-film resistor according to the present invention.

FIG. 11 shows a graph of the relation between the thickness $t_β$ of the electric resistance layer and the rate of resistance change $\Delta R/R_0$ in the β-phase Ta thin-film resistor according to the present invention. The structure of the subject resistor is Ta(5 nm)/NiCu(5 nm)/β-Ta($t_β$ nm). And the $\Delta R/R_0$ is the rate of change in the electric resistance when annealing in a vacuum with temperature of 600° C. for 5 hours, as is in the case shown in table 3 and FIG. 10.

As shown in FIG. 11, the $\Delta R/R_0$ has an almost constant value until the thickness $t_β$=100 nm, however, is significantly decreased as the $t_β$ exceeds 100 nm. This is considered to be because the crystal portion distant from the base film of the β-phase Ta thin-film has a less restraint for the (002) orientation by the base layer, as the thickness $t_β$ becomes larger. That is, the crystal portion of the β-phase Ta thin-film is considered to become likely to be transformed to the α-phase without resisting the direct compressive stress in the direction within the film plane.

In fact, as described above, the production field judges a heating element with the electric resistance decreased by 10% or more to be a failure component or a failure part. Here, the $\Delta R/R_0$ becomes just about −10% at $t_\beta$=150 nm as shown in FIG. 11. Therefore, from the judgment, the thickness $t_U$ is preferably set to be 150 nm or less. Further, also described above, as the second criterion of judgment in the production field, it is considered that the amount of decrease in the electric resistance of the heating element is more preferably within 3% for maintaining high quality. Here, the $\Delta R/R_0$ becomes just about −3% at $t_\beta$=110 nm as shown in FIG. 11. Therefore, from the criterion, the thickness $t_\beta$ is more preferably 110 nm or less.

On the other hand, it has been confirmed by the X-ray diffraction measurement that a β-phase Ta crystal structure with a high orientation cannot be formed even under the adequate conditions of the base layer, when the thickness to becomes less than 10 nm. Therefore, the thickness $t_\beta$ is preferably set to be in a range from 10 nm to 150 nm, and is more preferably in a range from 10 nm to 110 nm.

EXAMPLES 6 TO 8 AND CONVENTIONAL SAMPLES 3 TO 5

Figure 12:
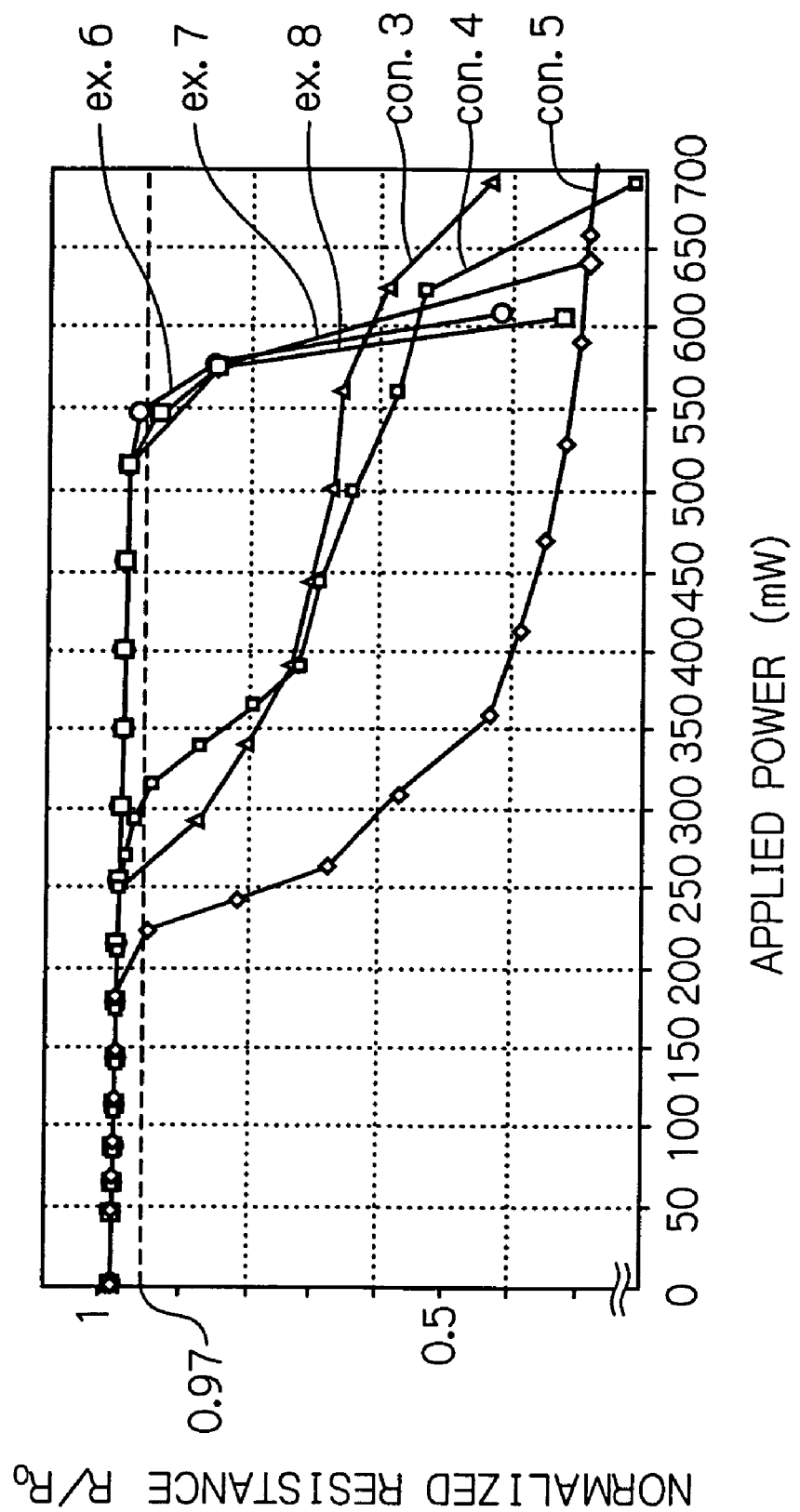
FIG. 12 shows a graph of the relation between the applied power and the electric resistance in heating elements having the β-phase Ta thin-film resistor according to the present invention.

FIG. 12 shows a graph of the relation between the applied power and the electric resistance in heating elements having the β-phase Ta thin-film resistor according to the present invention. Data of heating elements having the β-phase Ta thin-film provided with no base layer are also shown together for comparison. The horizontal axis of the graph is a power applied to the heating element, and the vertical axis is a normalized resistance $R/R_0$ that is a resistance of the heating element normalized by setting a resistance value before the power application to be 1. Further, in the graph, examples 6 to 8 are in the case of heating elements having the β-phase Ta thin-film resistor according to the present invention, And conventional samples 3 to 5 are in the case of heating elements having the β-phase Ta thin-film provided with no base layer. All the examples and samples here have the same specification except existence or nonexistence of the base layer.

As shown in FIG. 12, conventional samples 3 to 5 have significant decreases in the $R/R_0$ in the region that the applied power is about 200 mW (milliwatts) to about 300 mW. Further, conventional samples 3 to 5 show variations in the starting point and the degree of the decrease, regardless of the same specification. Here, also described above, it is considered in the production field that the amount of decrease in the electric resistance of the heating element is more preferably within 3% for maintaining high quality. According to the criterion, an allowable applied power is defined as a power when the $R/R_0$ falls to 0.97. In FIG. 12, the allowable applied powers are 293 mW in conventional sample 3, 257 mW in conventional sample 4, and 203 mW in conventional sample 5, respectively, thus, varied among samples. The variation in the allowable applied powers is considered to occur because of the following reason: Conventional samples 3 to 5 are easily transformed to the α-phase due to having no base layer. In that case, the fluctuation of the deposition environment such as the cleanliness of the substrate or the degree of vacuum during the deposition results in a variation in the degree of the phase transformation among the samples.

On the contrary, examples 6 to 8 have an unchanged $R/R_0$ even when the applied power reaches 500 mW, that is, the heating elements show an excellently stable resistance property. Next, the $R/R_0$ values of the examples are rapidly decreased as the applied power exceeds 500 mW. The decreases in the $R/R_0$ of examples 6 to 8 have little variation, that is, the examples have almost the same starting point and degree of the decrease. Actually, the allowable applied powers are 540 mW in example 6, 520 mW in example 7, and 525 mW in example, respectively, that is, examples 6 to 8 realize a stable allowable applied power about two times larger than those of conventional samples 3 to 5. The almost constant allowable applied powers are considered to be obtained because of the following reason: The crystal structure has little difference even under the fluctuation of the deposition environment and the phase transformation to the α-phase is sufficiently suppressed because a crystal growth with a high orientation of the β-phase Ta thin-film is sufficiently enhanced due to the existence of the base layer. Consequently, It is understood that the heating element comprising the β-phase Ta thin-film with the base layer according to the present invention has the more stable electric resistance property during power application compared to the conventional heating element having no base layer.

All the foregoing embodiments are by way of example of the present invention only and not intended to be limiting, and many widely different alternations and modifications of the present invention may be constructed without departing from the spirit and scope of the present invention. Actually, the β-phase Ta thin-film according to the present invention can also apply to all the elements using β-phase Ta thin-films, for example, switching elements used for liquid crystal displays under the condition that the base layer can be provided. Accordingly, the present invention is limited only as defined in the following claims and equivalents thereto.

The invention claimed is:

1. A thin-film resistor having a layered structure of:
   a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and
   an electric resistance layer formed of a β-phase tantalum film or an alloy film mainly containing β-phase tantalum, and deposited on said base layer,
   said electric resistance layer having a crystal structure in which (002) plane of the β-phase crystal is most strongly oriented to the layer surface.

2. The thin-film resistor as claimed in claim 1, wherein said electric resistance layer has a crystal structure in which a full width of half maximum of a rocking curve of (002) plane of the β-phase crystal is less than 5 degrees.

3. The thin-film resistor as claimed in claim 1, wherein said alloy film containing nickel and copper, said alloy film containing nickel and chromium or said alloy film containing copper and manganese of said double-layered film, or said single alloy film containing nickel and chromium has a film thickness in a range from 2 nanometers to 10 nanometers.

4. The thin-film resistor as claimed in claim 1, wherein said electric resistance layer has a layer thickness in a range from 10 nanometers to 150 nanometers.

5. The thin-film resistor as claimed in claim 1, wherein said electric resistance layer has a polycrystalline structure including crystal grains with an average crystal grain diameter that is more than two-tenths of the layer thickness.

6. The thin-film resistor as claimed in claim 1, wherein said electric resistance layer has a compressive stress in a direction within the layer plane.

7. A thin-film magnetic head comprising:
   a heating element for adjusting a flying height, comprising a thin-film resistor having a layered structure of:
   a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and an electric resistance layer formed of a β-phase tantalum film or an alloy film mainly containing β-phase tantalum, and deposited on said base layer, said electric resistance layer having a crystal structure in which (002) plane of the β-phase crystal is most strongly oriented to the layer surface;

an electromagnetic coil element for writing data signals; and a magnetoresistive effect element for reading data signals.

8. The thin-film magnetic head as claimed in claim 7, wherein said electric resistance layer has a crystal structure in which a full width of half maximum of a rocking curve of (002) plane of the β-phase crystal is less than 5 degrees.

9. The thin-film magnetic head as claimed in claim 7, wherein said alloy film containing nickel and copper, said alloy film containing nickel and chromium or said alloy film containing copper and manganese of said double-layered film, or said single alloy film containing nickel and chromium has a film thickness in a range from 2 nanometers to 10 nanometers.

10. The thin-film magnetic head as claimed in claim 7, wherein said electric resistance layer has a layer thickness in a range from 10 nanometers to 150 nanometers.

11. The thin-film magnetic head as claimed in claim 7, wherein said electric resistance layer has a polycrystalline structure including crystal grains with an average crystal grain diameter that is more than two-tenths of the layer thickness.

12. The thin-film magnetic head as claimed in claim 7, wherein said electric resistance layer has a compressive stress in a direction within the layer plane.

13. The thin-film magnetic head as claimed in claim 7, wherein said magnetoresistive effect element is a tunnel magnetoresistive effect element.

14. A head gimbal assembly comprising:
a thin-film magnetic head comprising:
a heating element for adjusting a flying height, comprising a thin-film resistor having a layered structure of:
a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and
an electric resistance layer formed of a β-phase tantalum film or an alloy film mainly containing β-phase tantalum, and deposited on said base layer,
said electric resistance layer having a crystal structure in which (002) plane of the β-phase crystal is most strongly oriented to the layer surface;
an electromagnetic coil element for writing data signals; and
a magnetoresistive effect element for reading data signals;
a support mechanism for supporting said thin-film magnetic head;
trace conductors of said electromagnetic coil element and said magnetoresistive effect element; and
trace conductors for applying currents to said thin-film resistor.

15. The head gimbal assembly as claimed in claim 14, wherein said electric resistance layer has a crystal structure in which a full width of half maximum of a rocking curve of (002) plane of the β-phase crystal is less than 5 degrees.

16. The head gimbal assembly as claimed in claim 14, wherein said alloy film containing nickel and copper, said alloy film containing nickel and chromium or said alloy film containing copper and manganese of said double-layered film, or said single alloy film containing nickel and chromium has a film thickness in a range from 2 nanometers to 10 nanometers.

17. The head gimbal assembly as claimed in claim 14, wherein said electric resistance layer has a layer thickness in a range from 10 nanometers to 150 nanometers.

18. The head gimbal assembly as claimed in claim 14, wherein said electric resistance layer has a polycrystalline structure including crystal grains with an average crystal grain diameter that is more than two-tenths of the layer thickness.

19. The head gimbal assembly as claimed in claim 14, wherein said electric resistance layer has a compressive stress in a direction within the layer plane.

20. The head gimbal assembly as claimed in claim 14, wherein said magnetoresistive effect element is a tunnel magnetoresistive effect element.

21. A magnetic disk drive apparatus comprising:
at least one head gimbal assembly comprising:
a thin-film magnetic head comprising:
a heating element for adjusting a flying height, comprising a thin-film resistor having a layered structure of:
a base layer formed of a double-layered film in which an alloy film containing nickel and copper, an alloy film containing nickel and chromium or an alloy film containing copper and manganese is stacked on a tantalum film, or formed of a single alloy film containing nickel and chromium; and
an electric resistance layer formed of a β-phase tantalum film or an alloy film mainly containing β-phase tantalum, and deposited on said base layer,
said electric resistance layer having a crystal structure in which (002) plane of the β-phase crystal is most strongly oriented to the layer surface;
an electromagnetic coil element for writing data signals; and
a magnetoresistive effect element for reading data signals;
a support mechanism for supporting said thin-film magnetic head;
trace conductors of said electromagnetic coil element and said magnetoresistive effect element; and
trace conductors for applying currents to said thin-film resistor;
at least one magnetic disk; and
a recording/reproducing and heating control means for controlling read and write operations of said thin-film magnetic head to said at least one magnetic disk, and for controlling currents supplied to said thin-film resistor.

22. The magnetic disk drive apparatus as claimed in claim 21, wherein said electric resistance layer has a crystal structure in which a full width of half maximum of a rocking curve of (002) plane of the β-phase crystal is less than 5 degrees.

23. The magnetic disk drive apparatus as claimed in claim 21, wherein said alloy film containing nickel and copper, said alloy film containing nickel and chromium or said alloy film containing copper and manganese of said double-layered film, or said single alloy film containing nickel and chromium has a film thickness in a range from 2 nanometers to 10 nanometers.

24. The magnetic disk drive apparatus as claimed in claim 21, wherein said electric resistance layer has a layer thickness in a range from 10 nanometers to 150 nanometers.

25. The magnetic disk drive apparatus as claimed in claim 21, wherein said electric resistance layer has a polycrystalline structure including crystal grains with an average crystal grain diameter that is more than two-tenths of the layer thickness.

26. The magnetic disk drive apparatus as claimed in claim 21, wherein said electric resistance layer has a compressive stress in a direction within the layer plane.

27. The magnetic disk drive apparatus as claimed in claim 21, wherein said magnetoresistive effect element is a tunnel magnetoresistive effect element.

* * * * *